United States Patent
Hirai et al.

(10) Patent No.: US 7,502,300 B2
(45) Date of Patent: Mar. 10, 2009

(54) OPTICAL PICKUP AND OPTICAL DATA PROCESSING APPARATUS

(75) Inventors: Hideaki Hirai, Kanagawa (JP); Toshimichi Nasukawa, Iwate (JP); Kazuhiro Umeki, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 10/878,343

(22) Filed: Jun. 29, 2004

(65) Prior Publication Data

US 2005/0025028 A1     Feb. 3, 2005

(30) Foreign Application Priority Data

Jul. 2, 2003    (JP)      ............... 2003-190596

(51) Int. Cl.
*G11B 7/135*     (2006.01)
(52) U.S. Cl. ................................. 369/112.07
(58) Field of Classification Search ...............................
369/112.03–112.07, 112.11–112.12, 112.23, 369/112.08
See application file for complete search history.

(56) References Cited

U.S. PATENT DOCUMENTS

| | | | | |
|---|---|---|---|---|
| 5,122,903 | A * | 6/1992 | Aoyama et al. | ............. 359/565 |
| 5,368,908 | A | 11/1994 | Ohta et al. | |
| 6,201,780 | B1 * | 3/2001 | Katayama | ............. 369/112.19 |
| 6,222,812 | B1 | 4/2001 | Yoo et al. | |
| 6,501,601 | B1 * | 12/2002 | Takasuka et al. | ....... 369/112.07 |
| 6,545,958 | B1 | 4/2003 | Hirai | |
| 6,636,365 | B2 * | 10/2003 | Saito et al. | ................... 359/719 |
| 6,650,612 | B1 | 11/2003 | Matsuzaki et al. | |
| 6,835,157 | B2 | 12/2004 | Haka | |
| 6,853,614 | B2 * | 2/2005 | Kim et al. | ............... 369/112.01 |
| 7,012,876 | B2 * | 3/2006 | Hendriks et al. | ....... 369/112.24 |
| 2002/0093902 | A1 | 7/2002 | Hirai et al. | |
| 2002/0159378 | A1 | 10/2002 | Lee et al. | |

(Continued)

FOREIGN PATENT DOCUMENTS

EP     0881634 A1     12/1998

(Continued)

OTHER PUBLICATIONS

Machine translation of JP 2000-348366.*

(Continued)

*Primary Examiner*—Andrea L Wellington
*Assistant Examiner*—Nathan Danielsen
(74) *Attorney, Agent, or Firm*—Dickstein Shapiro LLP

(57) ABSTRACT

An optical pickup is disclosed that includes a simplified phase correction element enabling sufficient correction of spherical aberration and realization of compatibility with blue-light, DVD-type and CD-type optical recording media with a two-stage numerical aperture switching operation. The phase correction element includes a phase shifting part and a diffraction part superposed on the phase shifting part. The phase shifting part has stepwise concentric circular regions including more than two stages. The diffraction part includes periodically arranged projecting and depressed portions formed on the phase shifting part. The phase shifting part suppresses spherical aberration related to red light used for a DVD-type optical recording medium when the object lens is optimized relative to blue light used for a blue-light optical recording medium. The diffraction part sets a most appropriate NA to each of the blue-light, DVD-type and the CD-type optical recording media by switching the numerical aperture.

11 Claims, 23 Drawing Sheets

U.S. PATENT DOCUMENTS

| | | | |
|---|---|---|---|
| 2002/0181366 A1* | 12/2002 | Katayama | 369/53.2 |
| 2002/0191502 A1 | 12/2002 | Hirai | |
| 2003/0072247 A1 | 4/2003 | Hirai | |
| 2003/0107979 A1* | 6/2003 | Kim et al. | 369/112.07 |
| 2003/0227859 A1 | 12/2003 | Hirai | |
| 2004/0047269 A1* | 3/2004 | Ikenaka et al. | 369/112.08 |

FOREIGN PATENT DOCUMENTS

| | | |
|---|---|---|
| EP | 1313095 A2 | 5/2003 |
| JP | 08-055363 | 2/1996 |
| JP | 3036314 | 1/1997 |
| JP | 2713257 | 10/1997 |
| JP | 2725653 | 12/1997 |
| JP | 10-334504 | 12/1998 |
| JP | 2000-187870 | 7/2000 |
| JP | 2000-348366 | 12/2000 |
| JP | 2000-348376 | 12/2000 |
| JP | 2001-209966 | 8/2001 |
| JP | 2001-216676 | 8/2001 |
| JP | 2003-67972 | 3/2003 |
| JP | 2003168236 A * | 6/2003 |
| WO | WO 0148745 A2 * | 7/2001 |

OTHER PUBLICATIONS

Machine translation of JP 2003-168236.*
"Blue/DVD/CD Compatible Optical Head with three wavelengths and a wavelength selective filter" by Katayama et al., ISOM 2001 Conference Abstract, pp. 30-31.
Katayama, R. et al., "Blue NA0.85/DVD/CD Compatible Optical Head", Optical Memory and Optical Data Storage Topical Meeting, International Symposium on Jul. 7-11, 2002, Piscataway, NJ, USA, IEEE, pp. 168-170.
Anonymous, "Five Schott Glass Types", Melles Griot Optics Guide, Jan. 11, 2003, http://web.archive.org/web/20030111230542/http://www.mellesgriot.com/products/optics/mp_3_1.htm>.

* cited by examiner

FIG.5B
FIG.5A
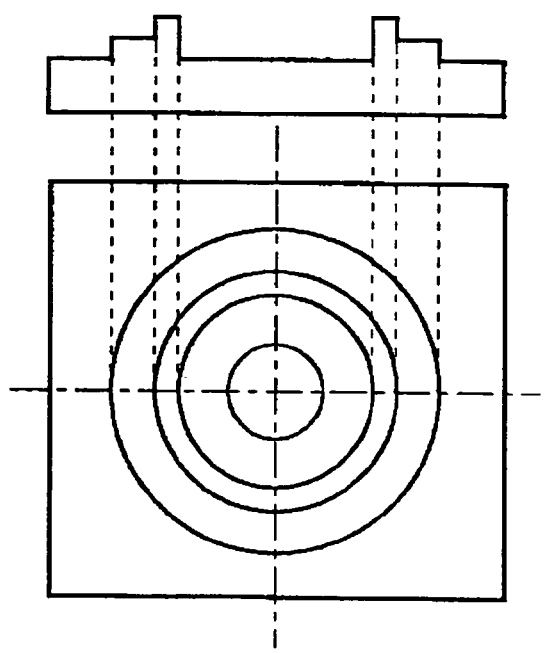
FIG.6B
FIG.6A
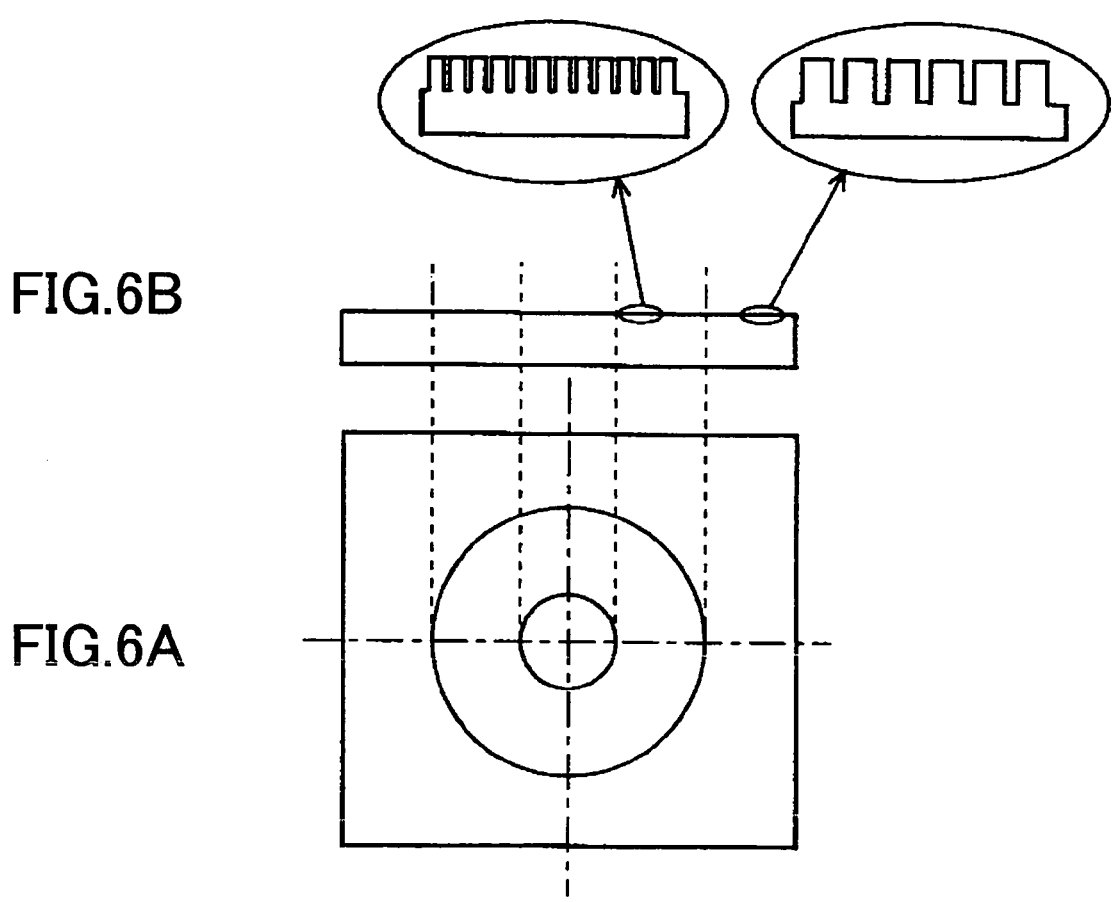

PARALLEL INCIDENCE
NO PHASE CORRECTION ELEMENT

PARALLEL INCIDENCE
NO PHASE CORRECTION ELEMENT

PARALLEL INCIDENCE
PHASE CORRECTION ELEMENT IS PRESENT

PARALLEL INCIDENCE
NO PHASE CORRECTION ELEMENT

DIVERGING INCIDENT LIGHT
PHASE CORRECTION ELEMENT IS PRESENT

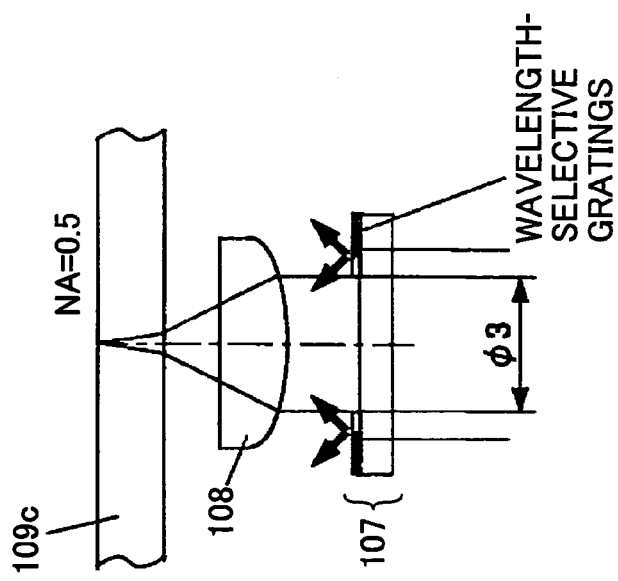
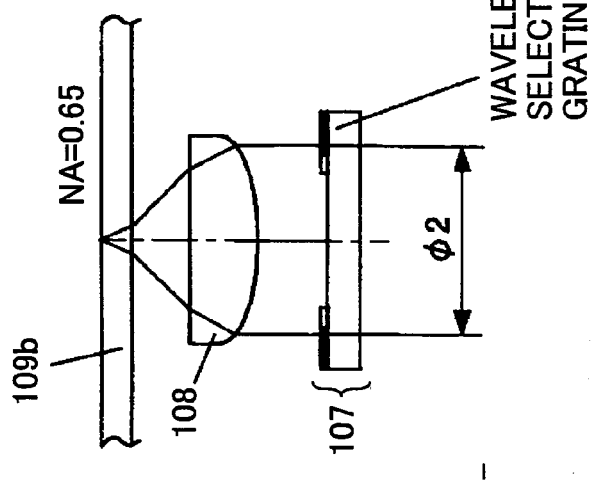
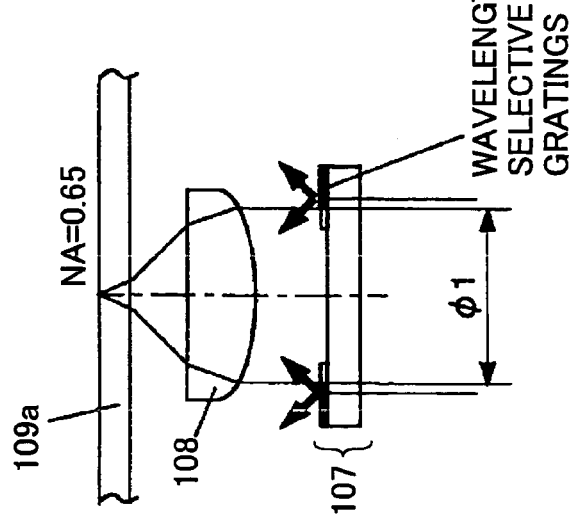

RADIAL POSITION OF OBJECT LENS

OPTICAL PICKUP AND OPTICAL DATA PROCESSING APPARATUS

BACKGROUND OF THE INVENTION

1. Field of the Invention

The present invention relates to an optical pickup that is capable of changing a phase distribution of light emitted from a plurality of light sources, and performs at least one of recording, reproduction and erasure of data in or from an optical recording medium, and an optical data processing apparatus including the optical pickup.

2. Description of the Related Art

Optical recording media, for example, a CD (Compact Disk) having a capacity of 0.65 GB, and a DVD (Digital Versatile Disk) having a capacity of 4.7 GB, are widely used for storing video and audio information, and data processed in a computer.

There are various ways to increase the recording density of an optical recording medium. For example, in an optical pickup, which reads data from or writes data in the optical recording medium, the numerical aperture (NA) of the object lens may be increased, or alternatively, the wavelength of light from a light source may be shortened, thereby reducing the size of a beam spot formed on the optical recording medium by a light beam condensed by the object lens.

For this reason, according to the current standard, in an optical pickup used for a CD-type optical recording medium, for example, the NA of the object lens is specified to be 0.50, and the wavelength of the light beam for data operations on the CD-type optical recording medium is specified to be 780 nm; in an optical pickup used for a DVD-type optical recording medium, for example, the NA of the object lens is specified to be 0.65, and the wavelength of the light beam for operations is specified to be 660 nm. In order to further increase the recording density of the optical recording medium, a new standard is required that enables a numerical aperture greater than 0.65, and a wavelength of the light beam shorter than 660 nm.

Such a new standard that enables usage of a larger numerical aperture and a shorter wavelength of the light beam has been proposed recently. On the other hand, a great number of CDs and DVDs conforming to the old standards are held by users. Thus, it is desirable that an optical information processing apparatus be able to handle both the optical recording media conforming to the new standard and those conforming to the old standards.

A simple way of achieving such compatibility is to include both a conventional optical pickup for the optical recording media conforming to the old standards and an optical pickup for the optical recording media conforming to the new standard in the same optical information processing apparatus. However, in this case, it is difficult to reduce the size and cost of the optical information processing apparatus.

FIG. 1 is a block diagram showing a configuration of an optical information processing apparatus able to be made compact.

In order to obtain compatibility between a CD-type optical recording medium and a DVD-type optical recording medium, and further a blue-light optical recording medium (an optical recording medium which is operated by a light beam in the blue wavelength region and thus has a lager storage capacity), the configuration shown in FIG. 1 may be used, which includes a light source 100 emitting blue light for operating the blue-light optical recording medium, a light source 200 for the DVD-type optical recording medium, a light source 300 for the CD-type optical recording medium, and one object lens for condensing light from the light sources 100, 200, and 300 on corresponding optical recording media.

However, there exist problems in the optical information processing apparatus shown in FIG. 1, which uses only one object lens to condense light of different wavelengths onto CD-type, DVD-type, and blue-light optical recording media, which conform to different standards.

First, different optical recording media, that is, optical recording media conforming to different standards, require different numerical apertures of the object lens. Therefore, with the apparatus shown in FIG. 1, it is necessary to change the numerical aperture of the object lens depending on the optical recording medium on or from which data are recorded or reproduced.

For example, an NA switching element for realizing compatibility between a DVD-type optical recording medium and a CD-type optical recording medium is disclosed in Japanese Patent Gazette No. 3240846 (referred to as "reference 1" hereinafter), Japanese Patent Gazette No. 2713257 (referred to as "reference 2" hereinafter), Japanese Patent Gazette No. 2725653 (referred to as "reference 3" hereinafter), and Japanese Utility Model Gazette No. 3036314 (referred to as "reference 4" hereinafter).

An NA switching element for realizing compatibility between a blue-light large capacity optical recording medium and a DVD-type optical recording medium is disclosed in Japanese Laid-Open Patent Application No. 2001-216676 (referred to as "reference 5" hereinafter).

A three-stage NA switching element for realizing compatibility between a blue-light large capacity optical recording medium, a DVD-type optical recording medium and a CD-type optical recording medium is disclosed in Japanese Laid-Open Patent Application No. 2000-187870 (referred to as "reference 6" hereinafter), and Japanese Laid-Open Patent Application No. 2003-67972 (referred to as "reference 7" hereinafter).

For example, consider an optical pickup that is able to handle the blue-light optical recording medium, which is irradiated by a light beam having a light wavelength ($\lambda 1$) equaling 407 nm, corresponds to a numerical aperture (NA ($\lambda 1$)) equaling 0.67, and has a substrate thickness (t1) equaling 0.6 mm on the light irradiation side; a DVD-type optical recording medium, which is irradiated by a light beam having a light wavelength ($\lambda 2$) equaling 660 nm, corresponds to a numerical aperture (NA($\lambda 2$)) equaling 0.65, and has a substrate thickness (t2) equaling 0.6 mm on the light irradiation side; and a CD-type optical recording medium, which is irradiated by a light beam having a wavelength ($\lambda 3$) equaling 780 nm, corresponds to a numerical aperture (NA($\lambda 3$)) equaling 0.50, and has a substrate thickness (t3) equaling 1.2 mm on the light irradiation side.

Here, it is assumed that the object lens is designed to produce a minimum spherical aberration when a parallel blue light beam for the blue-light optical recording medium is incident on the object lens (parallel light incidence is referred to as "infinite incidence" below where appropriate). When this object lens is irradiated by the light beam having a wavelength of 660 nm by infinite incidence so as to form a spot on the DVD-type optical recording medium, a spherical aberration occurs (described below with reference to FIG. 8B) due to the difference of the light wavelengths (407 nm and 660 nm).

Similarly, when the object lens is irradiated by the light beam having a wavelength of 780 nm by infinite incidence to form a spot on the CD-type optical recording medium, a spherical aberration occurs, too (described below with reference to FIG. 9B) because of the difference of the light source wavelengths (407 nm and 780 nm).

This problem occurs also for an optical pickup that handles only the DVD-type optical recording medium and the CD-type optical recording medium.

For example, the DVD-type optical recording medium is related to a light wavelength ($\lambda 2$) equaling 660 nm, a numerical aperture (NA($\lambda 2$)) equaling 0.65, and a substrate thickness (t2) equaling 0.6 mm on the light irradiation side, and the CD-type optical recording medium is related to a light wavelength ($\lambda 3$) equaling 780 nm, a numerical aperture (NA($\lambda 3$)) equaling 0.50, and a substrate thickness (t3) equaling 1.2 mm on the light irradiation side.

It is assumed that the object lens is designed to produce a minimum spherical aberration when a parallel light beam having a wavelength of 660 nm for the DVD optical recording medium is incident on the object lens. If this object lens is irradiated by the light beam having a wavelength of 780 nm by infinite incidence to form a spot on the CD-type optical recording medium, again, a spherical aberration occurs due to the difference of the light source wavelengths (660 nm and 780 nm).

The reference 3 and Japanese Laid-Open Patent Application No. 10-334504 (referred to as "reference 8" hereinafter) disclose optical pickups to solve this problem. Specifically, the optical pickup disclosed in reference 3 or reference 8 includes two semiconductor lasers emitting light beams of different wavelengths, and a wavelength-selective phase shifting element. One of the semiconductor lasers emits a light beam having a wavelength of 660 nm for recording or reproducing data in a DVD-type optical recording medium having a substrate thickness of 0.6 mm, and the other semiconductor laser emits a light beam having a wavelength of 780 nm for recording or reproducing data in a CD-type optical recording medium having a substrate thickness of 1.2 mm. The wavelength-selective phase shifting element does not change the phase distribution of the light beam having a wavelength of 660 nm, but does change the phase distribution of the light beam having a wavelength of 780 nm so as to correct the spherical aberration caused by the difference of the substrate thickness.

There is another well known method for solving the aforesaid problems, in which the light beam having a wavelength of 660 nm is incident on the DVD side of the object lens by infinite incidence, and the light beam having a wavelength of 780 nm is incident on the CD side of the object lens by finite incidence (that is, the incident light beam is diverging or focusing), thereby correcting the spherical aberration caused by difference of the substrate thickness.

Japanese Laid-Open Patent Application No. 2000-348366 (referred to as "reference 9" hereinafter) also discloses an invention related to the present field.

Further, based on the aforesaid related art, a method for recording data to or reproducing data from a CD-type optical recording medium, a DVD-type optical recording medium, and a blue-light optical recording medium with one object lens is proposed in ISOM 2001 Conference Abstract, pp 30-31, "Blue/DVD/CD Compatible Optical Head with Three Wavelengths and A Wavelength Selective Filter", Ryuichi Katayama and Yuichi Komatsu (referred to as "reference 10" hereinafter). Specifically, the optical pickup includes three semiconductor lasers emitting light beams having respective wavelengths of 405 nm, 650 nm, and 780 nm, and a wavelength-selective phase shifting element. The 405 nm light beam is incident, by infinite incidence, on a blue-light optical recording medium having a substrate thickness of 0.1 mm; the light beam having a wavelength of 660 nm is incident, by finite incidence, on a DVD-type optical recording medium having a substrate thickness of 0.6 mm; and the light beam having a wavelength of 780 nm is incident, by finite incidence, on a CD-type optical recording medium having a substrate thickness of 1.2 mm. The wavelength-selective phase shifting element does not change the phase distribution of the 405 nm light beam, but does change the phase distributions of the 660 nm light beam and the light beam having a wavelength of 780 nm to correct the spherical aberrations caused by the differences of the substrate thickness. In other words, this method utilizes two wave-front correction methods at the same time; one is the wavelength-selective phase shifting element, and the other is the finite incidence for the 660 nm light beam and the light beam having a wavelength of 780 nm.

Usually, the aforesaid NA switching element is mounted on an actuator, which moves the object lens in a focusing direction and tracking direction, so that the NA switching element is movable together with the object lens to keep the NA unchanged. In addition, the phase shifting element is also provided to be movable together with the object lens, because a deviation of the phase shifting element relative to an optical axis of the object lens may cause a coma aberration.

On the other hand, it is desirable that the number of parts of the actuator be reduced so as to reduce the weight of the actuator and reduce the number of steps of assembling the actuator. For example, one may attempt to bond the phase shifting element and the NA switching element together to simplify the process of assembling the phase shifting element and the NA switching element onto the actuator. But this does not reduce the weight of the actuator. In addition, one may attempt to use front and back surfaces of a glass substrate as the NA switching element and the phase shifting element, respectively. However, when fabricating a slim device, usually after the process of forming a surface shape on the front side of the glass substrate, the back side of the glass substrate is polished so as to reduce the thickness of the substrate. Therefore, if surface shapes are formed on both the front side and the back side of the glass substrate as the NA switching element and the phase shifting element, a relatively thick glass substrate is required, and after the surface shapes are formed on both sides, the glass substrate cannot be polished. That is, it is difficult to make the substrate thin. Furthermore, it is also difficult to control alignment accuracy of the front and the back sides.

Further, with the methods disclosed in the reference 10 and the reference 7, it is difficult to obtain sufficiently high wave-front performance for both the DVD-type optical recording medium and the CD-type optical recording medium. Generally, for the wave-front having an aberration at the diffraction limit, the Marechal criterion of 0.07 $\lambda$rms is used as a reference value of the aberration. In a practical optical pickup, however, there exist many kinds of errors, such as a thickness error, a tilt error of the optical recording medium, a defocus error related to position deviation of the object lens relative to the optical recording medium, and so on, and the aberration caused by these errors results in wave-front degradation. Thus, it is desirable that the aberration without contributions from the above errors, that is, the central value of the aberration, be less than or equal to 0.03 $\lambda$rms.

In the reference 10 and the reference 7, however, the central value of the aberration related to the DVD-type optical recording medium is about 0.05 $\lambda$rms, which is greater than 0.03 $\lambda$rms. This large aberration is due to the difficulty in minimizing the aberration related to both the DVD-type optical recording medium and the CD-type optical recording medium with a single optical element. In other words, when designing the phase correction element, one has to adopt only mean values of the theoretical optimal values, which give minimum aberrations for both the DVD-type optical recording medium and the CD-type optical recording medium, and as a result, it is difficult to sufficiently suppress the aberration for both the DVD-type optical recording medium and the CD-type optical recording medium.

In addition, the three-stage NA switching element used for the blue-light optical recording medium, the DVD-type optical recording medium and the CD-type optical recording medium, as disclosed in the reference 6 and the reference 7, has a rather complicated structure; thus, it is difficult to perform compensation for the wave-front performance, transmission rate and so on, and the design and fabrication of the NA switching element becomes quite cumbersome.

SUMMARY OF THE INVENTION

It is a general object of the present invention to solve one or more problems of the related art.

A first specific object of the present invention is to provide an optical pickup including an optical element that has a phase shifting function and a numerical aperture switching function, is able to be made thin and be fabricated by a fewer number of steps, and enables reduction of the weight of a movable actuator and the number of parts of the actuator, and an optical data processing apparatus including the optical pickup.

A second specific object of the present invention is to provide an optical pickup that enables sufficient reduction of spherical aberration while ensuring compatibility with a DVD-type optical recording medium and a CD-type optical recording medium, and an optical data processing apparatus including the optical pickup.

A third specific object of the present invention is to provide an optical pickup capable of realizing compatibility with a blue-light optical recording medium, a DVD-type optical recording medium and a CD-type optical recording medium with a two-stage numerical aperture switching operation rather than a three-stage numerical aperture switching operation, while allowing a numerical aperture switching element to be fabricated easily.

According to a first aspect of the present invention, there is provided an optical pickup comprising an optical system that directs a light beam onto an optical recording medium for data operation in the optical recording medium; and a phase correction element having a phase shifting part that generates a phase shift for the light beam, said phase shifting part including a plurality of phase shifting regions arranged in a plane perpendicular to an optical axis of the light beam, different said phase shifting regions generating different phase shifts, and a diffraction part that diffracts the light beam, said diffraction part including a plurality of diffraction regions and being superposed on the phase shifting part, different said diffraction regions diffracting different amounts of the light beam.

As an embodiment, the phase shifting part may have a stepwise shape including more than two stages as the phase shifting regions. Specifically, the phase shifting part may include stepwise concentric circular regions as the phase shifting regions.

As an embodiment, the diffraction part may include periodically arranged projecting and depressed portions formed on the phase shifting part.

As an embodiment, a center region of the phase shifting part and a center region of the diffraction part may be empty so as to allow the light beam to pass through.

As an embodiment, the optical pickup may include a first light source that emits a first light beam having a wavelength equaling $\lambda1$, a second light source that emits a second light beam having a wavelength equaling $\lambda2$, a third light source that emits a third light beam having a wavelength equaling $\lambda3$ ($\lambda1$, $\lambda2$, and $\lambda3$ satisfying $\lambda1<\lambda2<\lambda3$), and an object lens that condenses the first light beam, the second light beam and the third light beam to the corresponding optical recording medium. The phase shifting part generates a phase shift nearly equaling an integral multiple of $2\pi$ for each of two of the first light beam, the second light beam, and the third light beam.

As an embodiment, the wavelength $\lambda3$ may be nearly double the wavelength $\lambda1$; and the phase shifting part generates a phase shift nearly equaling an integral multiple of $2\pi$ for the first light beam and the third light beam.

As an embodiment, the phase shifting part generates a correction phase shift that produces an aberration having an opposite sign to a spherical aberration generated when the light beam without being phase-shifted by an integral multiple of $2\pi$ is condensed by the object lens on the optical recording medium.

As an embodiment, the optical pickup includes a first light source that emits a first light beam having a wavelength equaling $\lambda1$; a second light source that emits a second light beam having a wavelength equaling $\lambda2$; a third light source that emits a third light beam having a wavelength equaling $\lambda3$ ($\lambda1$, $\lambda2$, and $\lambda3$ satisfying $\lambda1<\lambda2<\lambda3$); and an object lens that condenses the first light beam, the second light beam and the third light beam to the corresponding optical recording medium. The diffraction part generates a phase difference nearly equaling an integral multiple of $2\pi$ for one of the first light beam, the second light beam, and the third light beam.

As an embodiment, the optical pickup includes a first light source that emits a first light beam having a wavelength equaling $\lambda1$; a second light source that emits a second light beam having a wavelength equaling $\lambda2$; a third light source that emits a third light beam having a wavelength equaling $\lambda3$ ($\lambda1$, $\lambda2$, and $\lambda3$ satisfying $\lambda1<\lambda2<\lambda3$); and an object lens that condenses the first light beam, the second light beam and the third light beam to the corresponding optical recording medium. The diffraction part generates a phase difference nearly equaling an integral multiple of $2\pi$ for each of two of the first light beam, the second light beam, and the third light beam.

As an embodiment, the object lens satisfies $NA(\lambda1)=NA(\lambda2)>NA(\lambda3)$, where $NA(\lambda1)$, $NA(\lambda2)$, $NA(\lambda3)$ are effective numerical apertures corresponding to the first light beam, the second light beam, and the third light beam; a first beam diameter $\phi1$ of the first light beam, a second beam diameter $\phi2$ of the second light beam, and a third beam diameter $\phi3$ of the third light beam satisfy $\phi2>\lambda1>\phi3$; and the diffraction part is formed in a first area corresponding to a beam diameter from $\phi3$ to $\phi1$, and in a second area corresponding to a beam diameter greater than $\phi1$.

As an embodiment, the object lens satisfies $NA(\lambda1)>NA(\lambda2)>NA(\lambda3)$, where $NA(\lambda1)$, $NA(\lambda2)$, $NA(\lambda3)$ are effective numerical apertures corresponding to the first light beam, the second light beam, and the third light beam; a first beam diameter $\phi1$ of the first light beam, a second beam diameter $\phi2$ of the second light beam, and a third beam diameter $\phi3$ of the third light beam satisfy $\phi1>\phi2>\phi3$; and the diffraction part is formed in a first area corresponding to a beam diameter from $\phi3$ to $\phi2$, and in a second area corresponding to a beam diameter greater than $\phi2$.

As an embodiment, the object lens satisfies $NA(\lambda1)>NA(\lambda2)>NA(\lambda3)$, where $NA(\lambda1)$, $NA(\lambda2)$, $NA(\lambda3)$ are effective numerical apertures corresponding to the first light beam, the second light beam, and the third light beam; a first beam diameter φ1 of the first light beam, a second beam diameter φ2 of the second light beam, and a third beam diameter φ3 of the third light beam satisfy φ1=φ2>φ3; and the diffraction part is formed in an area corresponding to a beam diameter greater than φ3.

As an embodiment, the object lens is configured to generate the smallest aberration when the first light beam is condensed by the object lens on the optical recording medium rather than when aberrations are generated by the second light beam and the third light beam.

As an embodiment, the first light beam is incident as a parallel light beam on the object lens; and at least one of the second light beam and the third light beam is incident as a diverging or focusing light beam on the object lens.

As an embodiment, the optical pickup further includes a light reception element configured to detect light reflected from the optical recording medium. A light beam diffracted by the diffraction part given a phase difference is condensed outside the light reception element.

As an embodiment, the first light beam is incident as a parallel light beam on the object lens; the second light beam is incident as a diverging or focusing light beam on the object lens; and the diffraction part is replaced by an opening arranged on an upstream side relative to the object lens at a predetermined distance t to a front principal point of the object lens, said predetermined distance t satisfying t=L−NA1*f/tan(asin(NA2obj)), where, f is the focal length of the object lens, NA1 is a numerical aperture corresponding to the first light beam on a side of an image plane relative to the object lens, NA2obj is a numerical aperture corresponding to the second beam on an object side relative to the object lens, and L is an object distance corresponding to the second light beam.

As an embodiment, glass materials of the phase shifting part and the diffraction part satisfy 1.50<nd<1.66, and 55<vd<85, where vd represents the Abbe's number, and nd represents a refractive index of the d line (589.3 nm) in the sodium (Na) spectrum.

As an embodiment, the optical pickup further includes a polarization unit configured to change a polarization state of the light beam according to the wavelength of the light beam. The polarization unit is formed to be integral with the phase shifting part and the diffraction part.

According to a second aspect of the present invention, there is provided an optical data processing apparatus that performs at least one of data recording, data reproduction, and data erasure in at least one of an optical recording medium operated by a light beam in a blue wavelength region, an optical recording medium operated by a light beam in a red wavelength region, an optical recording medium operated by a light beam in a infrared wavelength region, said optical data processing apparatus comprising an optical pickup, wherein the optical pickup includes an optical system that directs a light beam onto the optical recording medium for data operation in the optical recording medium; and a phase correction element having a phase shifting part that generates a phase shift for the light beam, said phase shifting part including a plurality of phase shifting regions arranged in a plane perpendicular to an optical axis of the light beam, different said phase shifting regions generating different phase shifts, and a diffraction part that diffracts the light beam, said diffraction part including a plurality of diffraction regions and being superposed on the phase shifting part, different said diffraction regions diffracting different amounts of the light beam.

According to the present invention, by superposing the diffraction part and the phase shifting part, the optical element can be made thin and light.

The center portion of the incident-beam is not diffracted, and loss of light amount and occurrence of aberration are preventable, enabling compatibility with blue-light, DVD-type and CD-type optical recording media.

The phase shifting part produces an aberration having an opposite sign to a spherical aberration generated when the light beam is condensed by the object lens, thereby correcting the spherical aberration.

The diffraction part performs numerical aperture switching according to the wavelength of the incident light beam, thereby allowing selected light beams to be transmitted.

According to the present invention, the most appropriate corresponding numerical apertures can be obtained for the first, second and third light beams.

Because the first light beam has the shortest wavelength, and therefore has narrow variation margins, by configuring the object lens to generate the smallest aberration when the first light beam is incident, it is possible to reduce aberration related to light beams having other wavelengths by phase correction, and reduce influence of diffracted light on the light reception element.

By two-stage numerical aperture switching operations, the most appropriate corresponding numerical apertures can be obtained for the blue-light, DVD-type and the CD-type optical recording media.

Using the glass materials as specified by the present invention, it is possible to for the phase shifting part to produce an aberration having an opposite sign to the original spherical aberration, and to reduce the size of the optical system.

These and other objects, features, and advantages of the present invention will become more apparent from the following detailed description of preferred embodiments given with reference to the accompanying drawings.

BRIEF DESCRIPTION OF THE DRAWINGS

FIG. 5A is a plan view of the phase shifting pattern according to the first embodiment;

FIG. 5B is a cross-sectional view of the phase shifting pattern in FIG. 5A;

FIG. 6A is a plan view of the diffraction pattern according to the first embodiment;

FIG. 6B is a cross-sectional view of the diffraction pattern in FIG. 6A;

FIGS. 15A through 15C are views each showing a portion of the optical pickup for NA switching, with the incident light beams in the blue, red, and infrared wavelength regions, respectively ($\phi2>\phi1>\phi3$) according to the first embodiment;

DESCRIPTION OF THE PREFERRED EMBODIMENTS

Below, preferred embodiments of the present invention are explained with reference to the accompanying drawings.

First Embodiment

Figure 1:
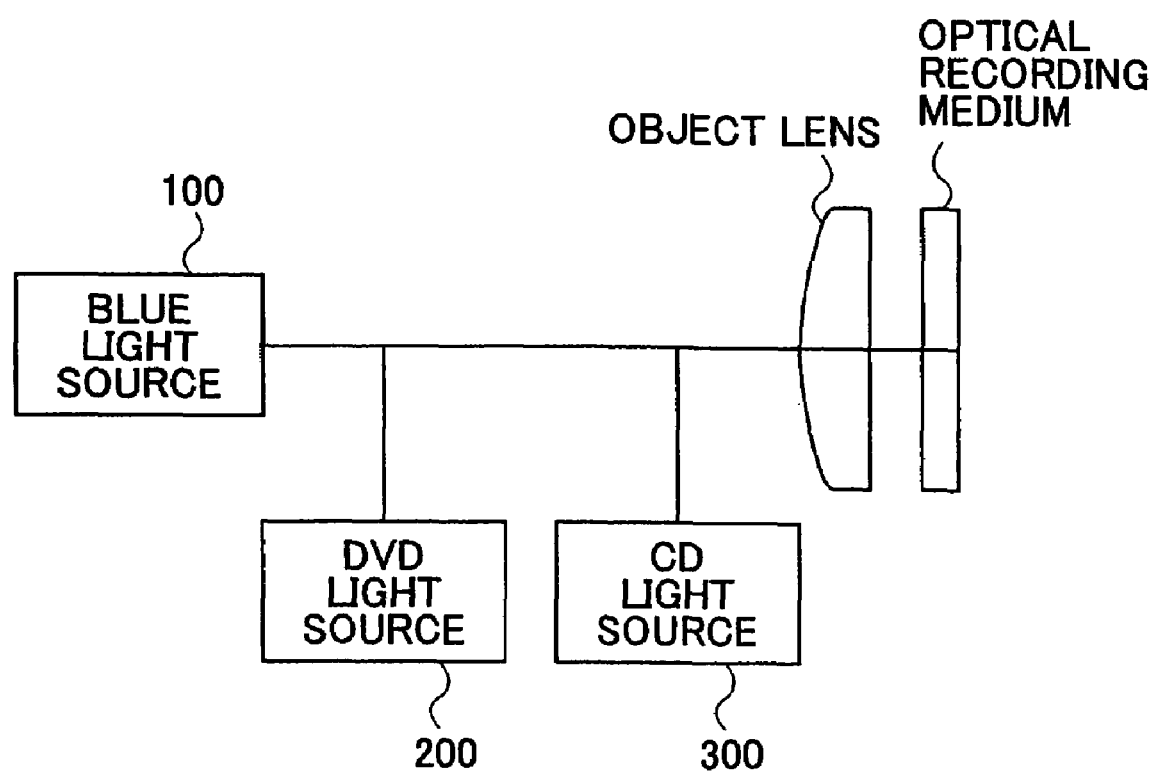
FIG. 1 is a block diagram showing a configuration of an optical information processing apparatus able to be made compact.
Figure 2:
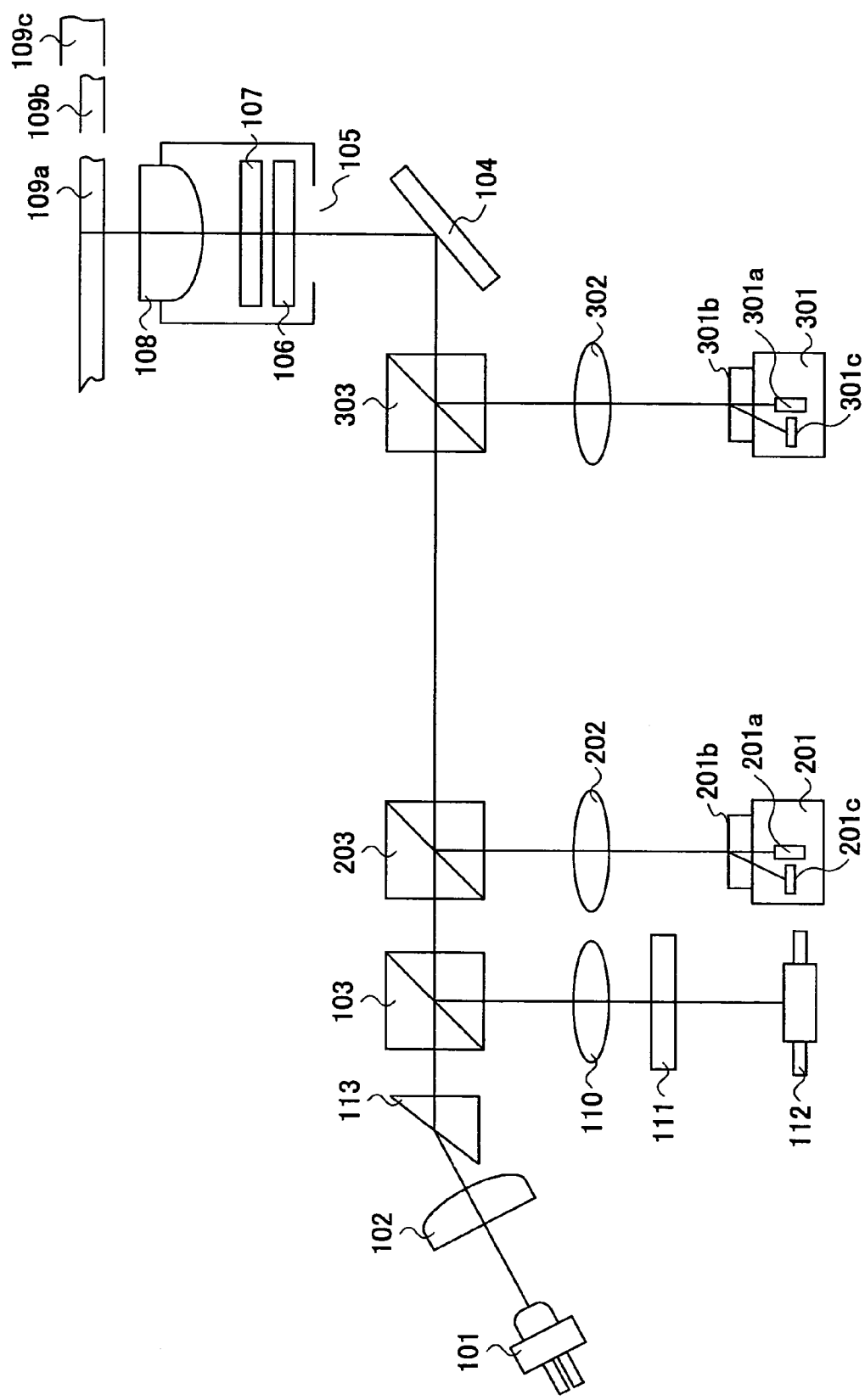
FIG. 2 is a schematic diagram showing a configuration of an optical pickup according to a first embodiment of the present invention.

FIG. 2 is a block diagram showing a schematic configuration of an optical pickup according to a first embodiment of the present invention. The optical pickup is able to record, reproduce or erase data to or from a blue-light optical recording medium, a DVD-type optical recording medium, and a CD-type optical recording medium.

The blue-light optical recording medium 109a uses a light source emitting a light beam having a wavelength of 407 nm in the blue wavelength region, corresponds to a numerical aperture (NA) equaling 0.65, has a substrate thickness equaling 0.6 mm on the light irradiation side. The DVD-type optical recording medium 109b uses a light source emitting a light beam having a wavelength of 660 nm, corresponds to a numerical aperture equaling 0.65, and uses a substrate thickness equaling 0.6 mm on the light irradiation side. The CD-type optical recording medium 109c uses a light source emitting a light beam having a wavelength of 780 nm, corresponds to a numerical aperture equaling 0.50, and has a substrate thickness equaling 1.2 mm on the light irradiation side.

A principal portion of the optical pickup as illustrated in FIG. 2 includes a semiconductor laser 101 emitting a light beam in the blue region, a collimator 102, a polarized beam splitter 103, dichroic prisms 203, 303, a deflecting prism 104, an opening 105, a ¼ wavelength plate 106, a phase correction element 107, an object lens 108, a detection lens 110, a beam divider 111, and a light reception element 112. These elements constitute a blue-light-related optical system, through which the blue light having a wavelength of 407 nm propagates.

A beam shaping prism 113 is arranged between the collimator 102 and the polarized beam splitter 103 to convert the light beam output from the semiconductor laser 101 from an elliptically-polarized light beam to a nearly circularly-polarized beam.

A hologram unit 201, a collimator lens 202, the dichroic prisms 203, 303, the deflecting prism 104, the opening 105, the ¼ wavelength plate 106, the phase correction element 107, and the object lens 108 constitute a DVD-related optical system, through which the red light having a wavelength of 660 nm propagates, for recording, reproduction or erasure operations on the DVD-type optical recording medium 109b.

A hologram unit 301, a coupling lens 302, the dichroic prism 303, the deflecting prism 104, the opening 105, the ¼ wavelength plate 106, the phase correction element 107, and the object lens 108 constitute a CD-related optical system, through which the infrared light having a wavelength of 780 nm propagates, for recording, reproduction or erasure operations on the CD-type optical recording medium 109c.

The dichroic prisms 203, 303, the deflecting prism 104, the opening 105, the ¼ wavelength plate 106, the phase correction element 107, and the object lens 108, as illustrated in FIG. 2, are commonly used by two or three of the aforesaid blue-light, DVD, and CD related optical systems.

The object lens 108 is designed such that the spherical aberration is the minimum when a parallel blue light having a wavelength of 407 nm is incident on the object lens 108 and is condensed on the blue-light optical recording medium corresponding to the 407 nm blue light, an NA of 0.65, and a substrate thickness equaling 0.6 mm on the light irradiation side.

The optical recording media 109a, 109b, and 109c have different substrate thicknesses and light wavelengths. The optical recording medium 109a is the blue-light optical recording medium having a substrate thickness equaling 0.6 mm on the light irradiation side. The optical recording medium 109b is the DVD-type optical recording medium having a substrate thickness equaling 0.6 mm on the light irradiation side. The optical recording medium 109c is the CD-type optical recording medium having a substrate thickness equaling 1.2 mm on the light irradiation side.

When recording data or reproducing data, one of the three recording media 109a, 109b, 109c, is set to a not-illustrated rotating mechanism and is driven to rotate at high speed.

The object lens 108 is provided on an actuator, which moves the object lens 108 in a focusing direction and a tracking direction. The opening 105 above a bobbin for holding the object lens 108 on the actuator is able to limit the incident light beam.

Below, a description is given to operations, in the aforesaid optical pickup, of recording, reproducing, or deleting data on or from the blue-light optical recording medium 109a which is related to a 407 nm blue-light, an NA of 0.65, and a substrate thickness equaling 0.6 mm on the light irradiation side.

Divergent linear polarized light emitted from the semiconductor laser 101 and having a wavelength of 407 nm is converted to a nearly parallel beam in the collimator 102, and passes through the beam shaping prism 113, the polarized beam splitter 103, and the dichroic prisms 203, 303. The direction of the light beam is deflected by 90 degrees by the deflecting prism 104. The deflected beam passes through the opening 105, and is converted to circularly-polarized light in the ¼ wavelength plate 106. In the phase correction element 107, the NA of the light beam is limited to 0.65, then the light beam is incident on the object lens 108, and is focused on the optical recording medium 109a, forming a small spot thereon. With this spot, operations of data recording, reproduction, or erasure in the optical recording medium 109a are performed.

Light reflected from the optical recording medium 109a is also circularly-polarized light, with the rotating direction of the electromagnetic vector being opposite to that of the incident light, and is nearly parallel. The reflected nearly-parallel light is converted to light linearly-polarized perpendicular to the incident direction in the ¼ wavelength plate 106, reflected on the polarized beam splitter 103, then is focused in the detection lens 110, and divided into several beams and deflected to several directions by the beam divider 111. Finally, these light beams are incident on and detected by the light reception element 112. The light reception element 112 obtains information signals and servo signals from the detected beams.

Below, a description is given to operations, in the optical pickup, of recording, reproducing, or deleting data on or from the DVD-type optical recording medium 109b which is related to a 660 nm red light beam, an NA of 0.65, and a substrate thickness equaling 0.6 mm on the light irradiation side.

In FIG. 2, the hologram unit 201 includes a semiconductor laser chip 201a, a hologram 201b, and a reception element 201c, which are formed integrally. The 660 nm red light beam is output from the semiconductor laser chip 201a of the hologram unit 201, passes through the hologram 201b, and is converted to a nearly parallel light beam in the collimator lens 202.

In the dichroic prism 203, which allows blue light to transmit through but reflects red light, the nearly parallel 660 nm red light beam is reflected in a direction toward the deflecting prism 104. The direction of the light beam is deflected by 90 degrees by the deflecting prism 104. The deflected beam passes through the opening 105, thereby, limiting the NA of the light beam to 0.65, and is converted to circularly-polarized light in the ¼ wavelength plate 106. In the phase correction element 107, a specified value of the phase is added to the light beam as described below, then the light beam is incident on the object lens 108, and is focused on the optical recording medium 109b, forming a small spot thereon. With this spot, operations of data recording, reproduction, or erasure in the optical recording medium 109b are performed.

Light reflected from the optical recording medium 109b is deflected by the deflecting prism 104, and is reflected in the dichroic prism 203, then is focused by the collimator lens 202.

Figure 3:
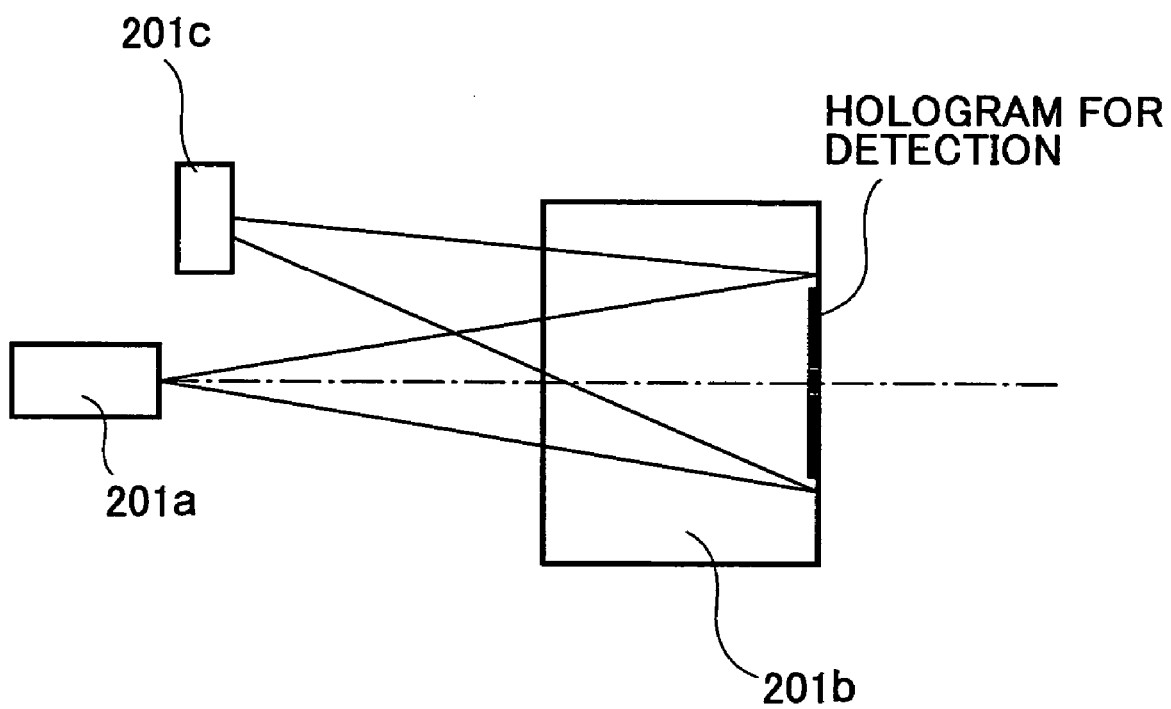
FIG. 3 is a schematic view showing a configuration of the hologram unit 201 according to the first embodiment.

FIG. 3 is a schematic view showing a configuration of the hologram unit 201.

The light beam is incident on the hologram 201b, and is diffracted by the hologram 201b in a direction toward the reception element 201c, which is located in the same can as the semiconductor laser chip 201a. The incident light beam is incident on and detected by the light reception element 201c, and the light reception element 201c obtains information signals and servo signals from the detected light beams.

Below, a description is given to operations, in the optical pickup, of recording, reproducing, or deleting data on or from the CD-type optical recording medium 109c which is related to a 780 nm infrared light beam, an NA of 0.50, and a substrate thickness equaling 1.2 mm on the light irradiation side.

Similar to the DVD-related optical system, the hologram unit 301 is used to divide a light beam. As illustrated in FIG. 2, the hologram unit 301 includes a semiconductor laser chip 301a, a hologram 301b, and a reception element 301c, which are formed integrally and located in the same can. The 780 nm infrared light beam is output from the semiconductor laser chip 301a of the hologram unit 301, passes through the hologram 301b, and is converted to a divergent light beam in the coupling lens 302.

In the dichroic prism 303, which allows blue and red Light to transmit through but reflects infrared light, the divergent 780 nm infrared light beam is reflected toward the deflecting prism 104. The light beam is deflected by 90 degrees by the deflecting prism 104. The deflected beam passes through the opening 105, and is converted to circularly-polarized light from elliptically-polarized light in the ¼ wavelength plate 106. In the phase correction element 107, the NA of the light beam is limited to 0.50, then the light beam is incident on the object lens 108, and is focused on the optical recording medium 109c, forming a small spot thereon. With this spot, operations of data recording, reproduction, or erasure in the optical recording medium 109c are performed.

Light reflected from the optical recording medium 109c is deflected by the deflecting prism 104, and is reflected in the dichroic prism 303, then is focused by the coupling lens 302. The focused light beam is incident on the hologram 301b, and is diffracted by the hologram 301b in a direction toward the reception element 301c. The incident light beam is incident on and detected by the light reception element 301c, and the light reception element 301c obtains information signals and servo signals from the detected light beams.

The phase correction element 107 used in the optical pickup according to the present embodiment includes a diffraction pattern superposed on a phase shifting pattern.

The phase shifting pattern looks like concentric circles in a plane perpendicular to the optical axis of the light beam, and the phase shifting pattern has a stepwise shape, for example, including two or more stages.

The cross section of the diffraction pattern has a grating shape, including periodically arranged projecting and depressed portions. For example, the diffraction pattern includes periodically arranged grooves.

The phase shifting pattern suppresses the spherical aberration, which occurs when the red light used for the DVD-type optical recording medium 109b is incident on the object lens 108, which is optimized for the parallel blue incident light beam.

The diffraction pattern changes the numerical aperture so as to obtain the most appropriate numerical aperture for the blue light optical recording medium 109a, the DVD-type optical recording medium 109b, and the CD-type optical recording medium 109c, respectively.

Figures 4A, 4B:
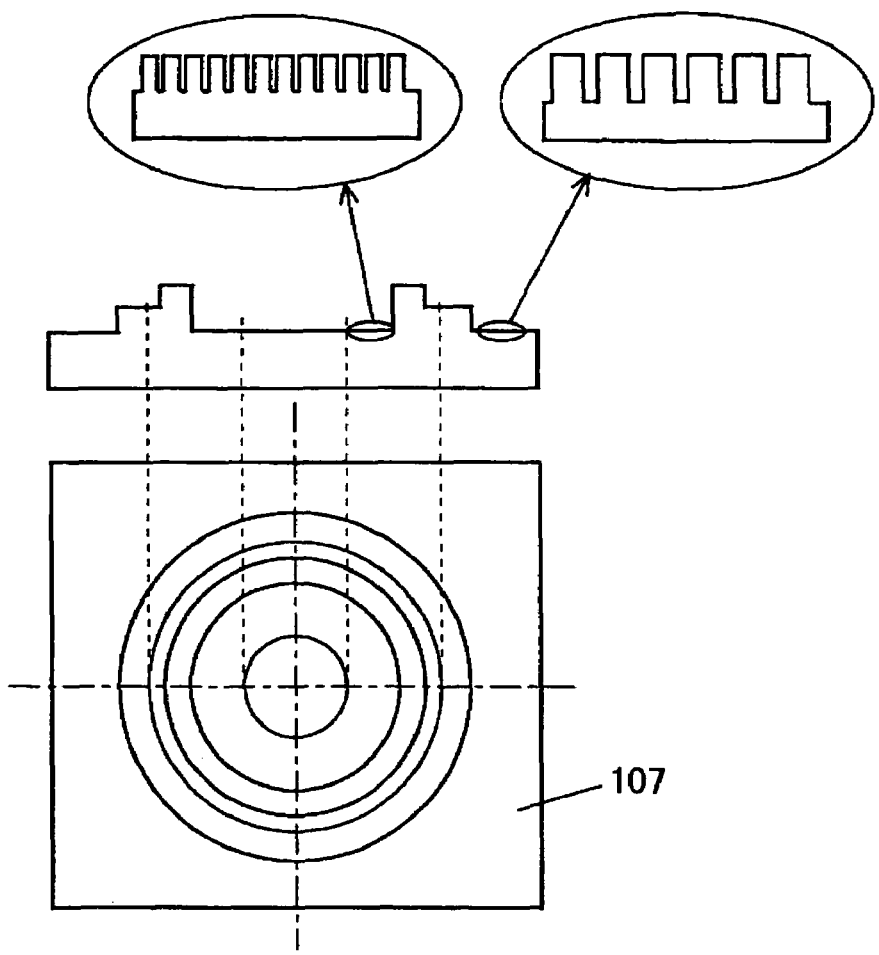
FIG. 4A is a plan view of the phase correction element 107 according to the first embodiment.
FIG. 4B is a cross-sectional view of the phase correction element 107 in FIG. 4A.

FIG. 4A is a plan view of the phase correction element 107.

FIG. 4B is a cross-sectional view of the phase correction element 107 in FIG. 4A.

FIG. 5A is a plan view of the phase shifting pattern.

FIG. 5B is a cross sectional view of the phase shifting pattern in FIG. 5A.

FIG. 6A is a plan view of the diffraction pattern.

FIG. 6B is a cross-sectional view of the diffraction pattern in FIG. 6A.

The phase correction element 107 illustrated in FIGS. 4A and 4B include the diffraction pattern in FIGS. 6A and 6B superposed on the phase shifting pattern in FIGS. 5A and 5B.

The reference 9 proposes that a phase shifting region and an NA switching region be provided separately in each element region. In the present embodiment, however, the diffraction pattern is superposed on the phase shifting pattern, and thereby, it is possible to obtain compatibility with the blue-light optical recording medium 109a, the DVD-type optical recording medium 109b, and the CD-type optical recording medium 109c.

Figure 7A:
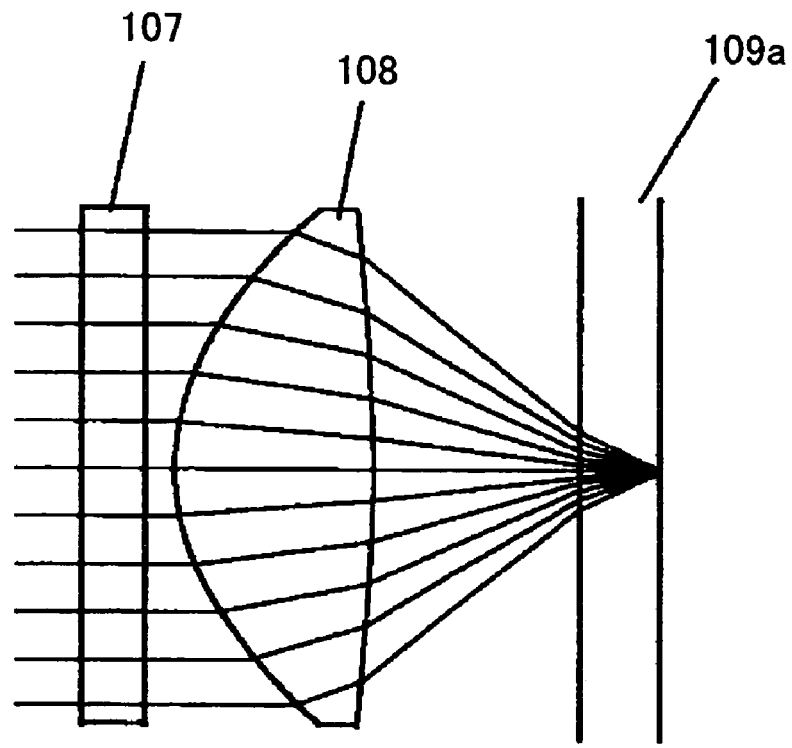
FIG. 7A is a schematic view of a portion of the optical pickup for irradiating light having a wavelength of 407 nm on the optical recording medium 109*a* according to the first embodiment.
Figure 8A:
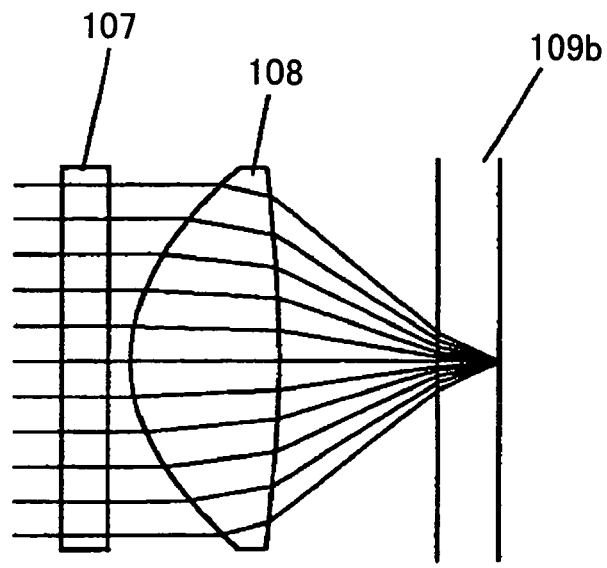
FIG. 8A is a schematic view of a portion of the optical pickup for irradiating light having a wavelength of 660 nm on the optical recording medium 109b according to the first embodiment.
Figure 9A:
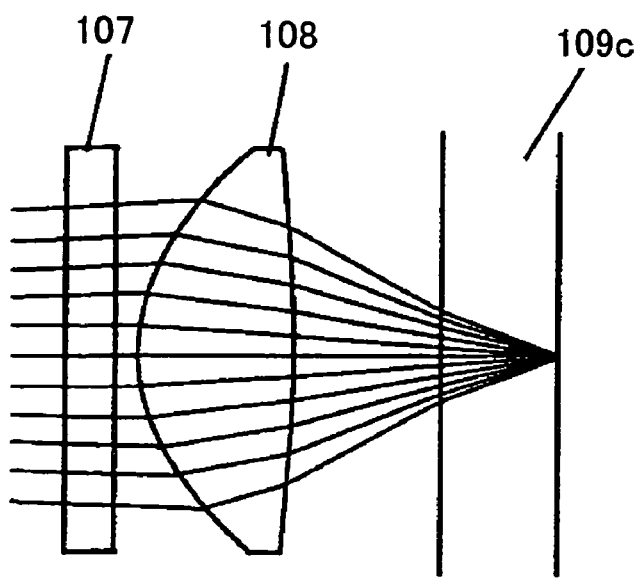
FIG. 9A is a schematic view of a portion of the optical pickup for irradiating light having a wavelength of 780 nm on the optical recording medium 109c according to the first embodiment.

FIG. 7A, FIG. 8A, and FIG. 9A are schematic views of portions of the optical pickup for irradiating light on the optical recording media 109, showing light paths along the phase correction element 107 and the object lens 108 for data recording and data reproduction, where FIG. 7A, FIG. 8A, and FIG. 9A correspond to wavelengths of 407 nm, 660 nm, and 780 nm, respectively.

The object lens 108 is designed to produce a minimum spherical aberration when being irradiated by a parallel light beam having a wavelength of 407 nm.

Then, if the object lens 108 is irradiated by the red light beam having a wavelength of 660 nm by infinite incidence (that is, the incident light on the object lens 108 is parallel) to form a spot on the DVD-type optical recording medium 109b, a spherical aberration occurs due to the difference of the wavelengths of the incident light and the difference of the substrate thicknesses of the optical recording media.

Similarly, if the object lens 108 is irradiated by the infrared light beam having a wavelength of 780 nm by infinite incidence to form a spot on the CD-type optical recording medium 109c, a spherical aberration occurs, too, due to the difference of the wavelengths of the incident light and the difference of the substrate thicknesses of the optical recording media.

Figure 7B:
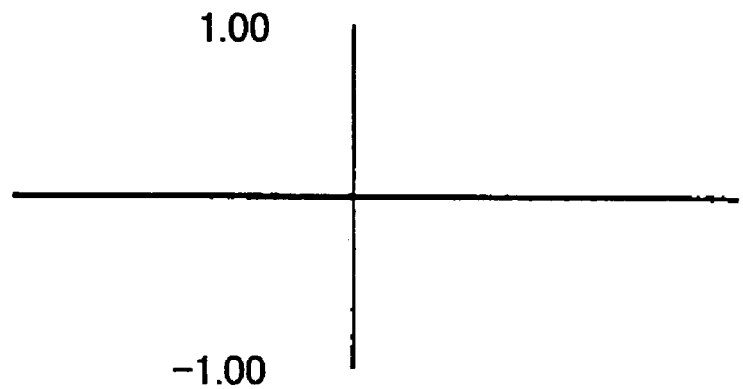
FIG. 7B shows the spherical aberration related to the light having a wavelength of 407 nm.

FIG. 7B shows the spherical aberration related to the blue light having a wavelength of 407 nm.

Figure 8B:
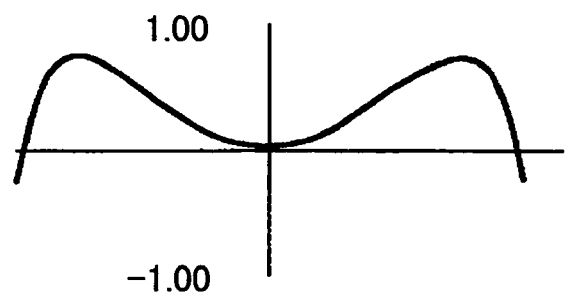
FIG. 8B is a graph showing the spherical aberration that is related to parallel incident light beam having a wavelength of 660 nm and is generated due to differences of light wavelengths and recording medium substrate thicknesses.

FIG. 8B is a graph showing the spherical aberration due to differences of light wavelengths and recording media substrate thicknesses, with the incident light being the red light beam having a wavelength of 660 nm.

Figure 9B:
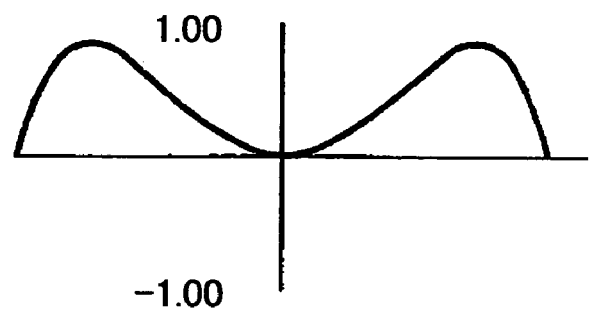
FIG. 9B is a graph showing the spherical aberration that is related to a parallel incident light beam having a wavelength of 780 nm and is generated due to differences of light wavelengths and recording medium substrate thicknesses.

FIG. 9B is a graph showing the spherical aberration due to differences of light wavelengths and recording media substrate thicknesses, with the incident light being the infrared light beam having a wavelength of 780 nm.

In FIG. 7B, FIG. 8B, FIG. 9B, the abscissa indicates a height of the incident light beam, that is, the distance from the optical axis, being normalized by the diameter of the object lens 108; the ordinate indicates the spherical aberration.

In the present embodiment, the phase shift pattern is used in the phase correction element 107 in order to produce a spherical aberration having an opposite sign to the original spherical aberration generated in the DVD-related optical system, as shown in FIG. 8B.

In addition, for the CD-type optical recording medium 109c, finite incidence (that is, the incident light is divergent) is employed to produce a spherical aberration having an opposite sign to the spherical aberration as shown in FIG. 9B.

The phase shift pattern of the phase correction element 107 is a wavelength-selective pattern, having insensitive regions for the 407 nm blue light and the 780 nm infrared light beam. With such a configuration, unnecessary actions can be eliminated at wavelengths of 407 nm and 780 nm, and the phase correction element 107 can sufficiently functions at the wavelength of 660 nm.

Below, conditions that the insensitive regions should satisfy are described in detail.

Here, a region insensitive to incident light at 407 nm or 780 nm indicates an optical region that does not change the original phase of the incident light beam or changes the original phase of the incident light beam by exactly $2\pi$.

With the refractive index of the substrate of the optical recording media 109 to be represented by n, the height of the first step of the stepwise shape by h, and the wavelength of light from the light source by $\lambda$, the phase difference $\delta(\lambda)$ caused by the phase shift pattern can be described by the following equation 3.

$$\delta(\lambda)=2\pi(n-1)h/\lambda \quad (3)$$

According to equation 3, the phase difference $\delta$ (407 nm), $\delta$ (780 nm) can be adjusted to be equal to an integral multiple of $2\pi$ by properly selecting the substrate refractive index n, the height of the first step h, and the wavelength $\lambda$.

For example, the height of the first step h is set to be 1.34 $\mu$m. For the blue light beam with $\lambda$=407 nm, using BaCD5 produced by HOYA Company as the substrate material, whose refractive index n is 1.604949, the phase difference $\delta$ (407 nm) equals 4.0$\pi$. For the red light beam with $\lambda$=660 nm, with the substrate refractive index n being 1.586051, the phase difference $\delta$ (660 nm) equals 2.4$\pi$. For the infrared light beam with $\lambda$=780 nm, with the substrate refractive index n being 1.582509, the phase difference $\delta$ (780 nm) equals 2.0$\pi$.

Figure 10:
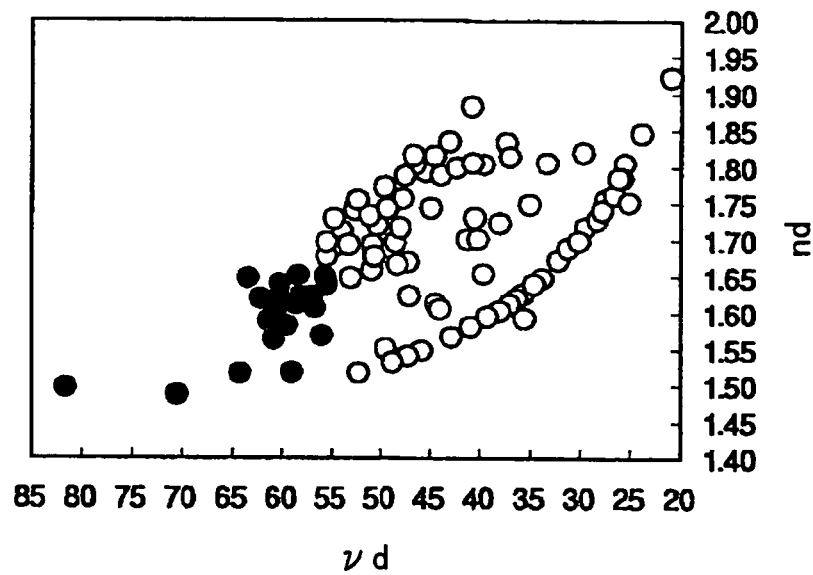
FIG. 10 is a glass map showing glass materials of HOYA Company according to the first embodiment, where the abscissa represents the Abbe's number vd, and the ordinate represents the refractive index (nd) of the d line (589.3 nm) in the sodium (Na) spectrum.

FIG. 10 is a so-called glass map showing glass products of HOYA Company, where the abscissa represents the Abbe's number vd, the ordinate represents the refractive index (nd) of the d line (589.3 nm) in the sodium (Na) spectrum, which is often used as a reference wavelength.

In the map in FIG. 10, the black dots indicate glass materials satisfying following equation (inequality) 4 and equation (inequality) 5.

$$1.50<\text{nd}<1.66 \quad (4)$$

$$55<\text{vd}<85 \quad (5)$$

These glass materials indicated by the black dots are summarized in table 1.

With any one material selected from table 1, and with $\lambda$=407 nm or $\lambda$=780 nm, the resulting phase difference turns out to be close to an integral multiple of $2\pi$, with the discrepancy less than 0.01$\pi$. Therefore, these glass materials can be used as the aforesaid insensitive regions for the blue light beam with $\lambda$=407 nm and the infrared light beam with $\lambda$=780 nm.

The phase correction element 107 may be fabricated by glass molding, etching, or cutting. Further, use can also be made of resins that are located in the region shown in FIG. 10 and have good moldability and transferability. In this case, the phase correction element 107 may be formed by injection shaping by using a mold having a concentric pattern.

As indicated by the glass map in FIG. 10 and the equation 3, when selecting a glass substrate material so that the phase differences $\delta$ (407 nm) and $\delta$ (660 nm) are to be equal to an integral multiple of $2\pi$, or when selecting a glass substrate material so that the phase differences $\delta$ (660 nm) and $\delta$ (780 nm) are to be equal to an integral multiple of $2\pi$, it is preferable that wavelengths 407 nm and 780 nm be used for this selection because the ratio of these two wavelengths is large (close to 2), and there exist many glass materials in this double wavelength region resulting in phase differences equal to an integral multiple of $2\pi$.

With glass materials selected in the above ways, the phase correction element 107 may be formed to have a stepwise shape so that spherical aberration produced by an optical subsystem including the phase correction element 107 and the object lens 108 substantially cancels the spherical aberration produced when the 660 nm red light beam passing through the object lens 108 transmits through the 0.6 mm thick substrate of the DVD-type optical recording medium 109b.

Figure 11:
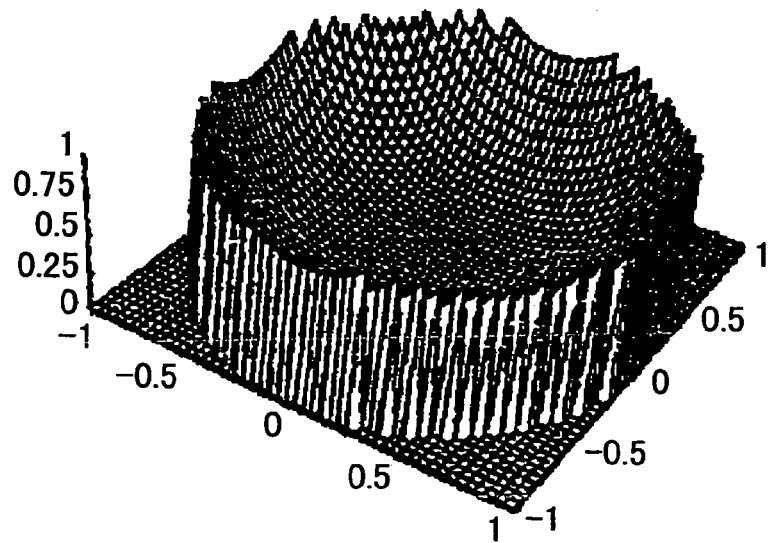
FIG. 11 is a histogram illustrating the spherical aberration caused by the difference of wavelengths of incident light beams.

The spherical aberration caused by a difference of wavelengths of light in use is illustrated in FIG. 11.

FIG. 11 is a histogram illustrating the spherical aberration caused by the difference of wavelengths of light in use.

Figure 12A:
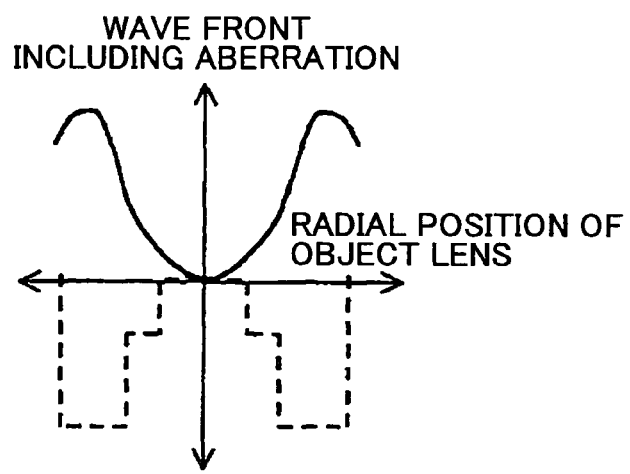
FIG. 12A shows the wave front including the spherical aberration (solid line) and the phase shift pattern (dashed line)

FIG. 12A shows the wave front including the spherical aberration (solid line) and the phase shift pattern (dashed line), where the wave front is illustrated with a quadratic curve (solid line).

The stepwise shape of the phase shift pattern is adjusted so as to provide phase differences (as shown by the dashed line in FIG. 12A) to the light incident on the object lens 108.

After the incident light beam irradiates the phase shift pattern, portions of the wave front of the incident light beam are delayed, thereby substantially canceling the spherical aberration shown by the solid line.

Figure 12B:
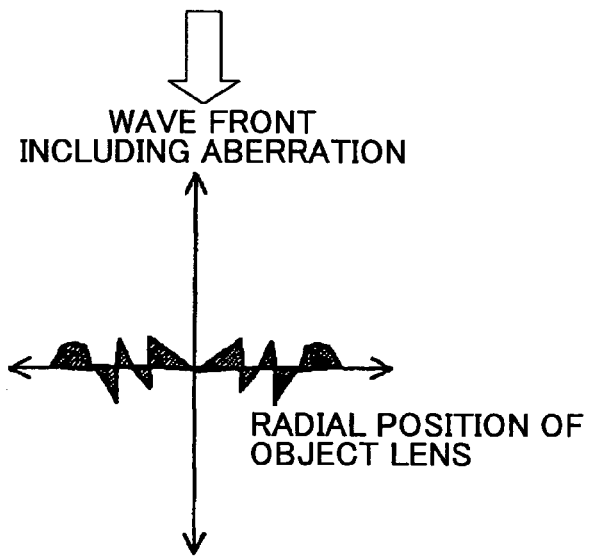
FIG. 12B shows the wave front with the spherical aberration being corrected.

FIG. 12B shows the wave front with the spherical aberration being corrected.

The graph in FIG. 12B is obtained by summing the solid line (the original spherical aberration) and the dashed line (phase delay caused by the phase shift pattern). As shown in FIG. 12B, the spherical aberration is greatly reduced.

Figure 13:
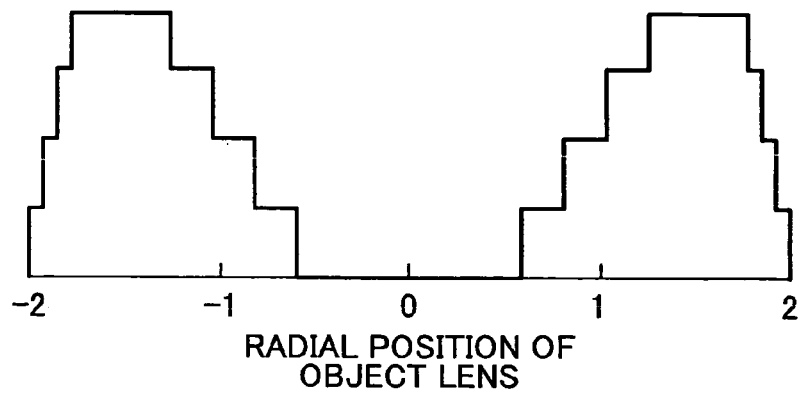
FIG. 13 is a view showing a cross section of the phase shift pattern for producing the spherical aberration having a sign opposite to the spherical aberration in FIG. 8B according to the first embodiment.

Returning to FIGS. 8A through 8C, in order to produce a spherical aberration having the opposite sign to the original spherical aberration generated in the DVD-related optical system, as shown in FIG. 8B, in the present embodiment, the phase shift pattern having a stepwise shape as illustrated in FIG. 13 can be used.

FIG. 13 is a view showing a cross section of the phase shift pattern for producing the spherical aberration having a sign opposite to the spherical aberration, as shown in FIG. 8B, generated in the DVD-related optical system.

Figure 8C:
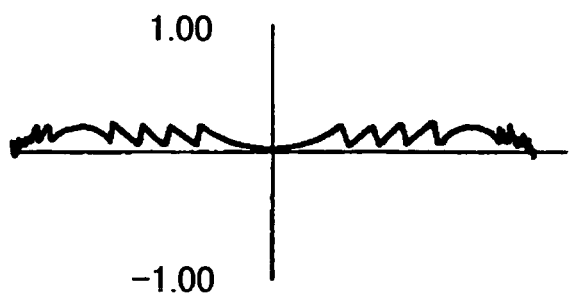
FIG. 8C is a graph showing a wave front related to the optical recording medium 109b with the spherical aberration being corrected by using a parallel incident light beam.

FIG. 8C is a graph showing the wave front with the spherical aberration being corrected.

As illustrated in FIG. 8C, because of usage of the phase shift pattern shown in FIG. 13, the spherical aberration is reduced to 0.05 $\lambda$rms, at a similar level to that in the reference 10 even if finite incidence is not used. This is because a pattern can be formed to be exclusively used for the DVD-type optical recording medium 109b.

Figure 9C:
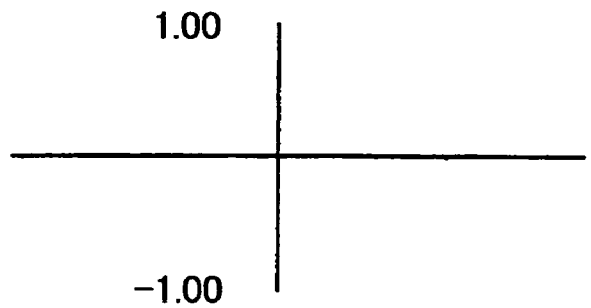
FIG. 9C is a graph showing the wave front related to the optical recording medium 109c with the spherical aberration being corrected by using a diverging or focusing incident light beam.

FIG. 9C is a graph showing the wave front with the spherical aberration being corrected by using a finite incidence system for the CD-type optical recording medium 109c.

In FIG. 9C, the RMS equals 0.006 $\lambda$rms, sufficiently smaller than the practically required value 0.03 $\lambda$rms, therefore, good spots can be formed on the CD-type optical recording medium 109c.

Next, a description is given to the NA switching element.

With an object lens being designed to result in an optimum wave front in the blue wavelength region, if a red light beam having a beam diameter the same as that of a blue light beam is incident on the object lens by infinite incidence, the refractive power of the object lens decreases, and accordingly the numerical aperture (NA) decreases. For this reason, in this embodiment, in the red wavelength region, the beam diameter $\phi 2$ is set larger than the beam diameter $\phi 1$ of the light beam in the blue wavelength region.

Figure 14A:
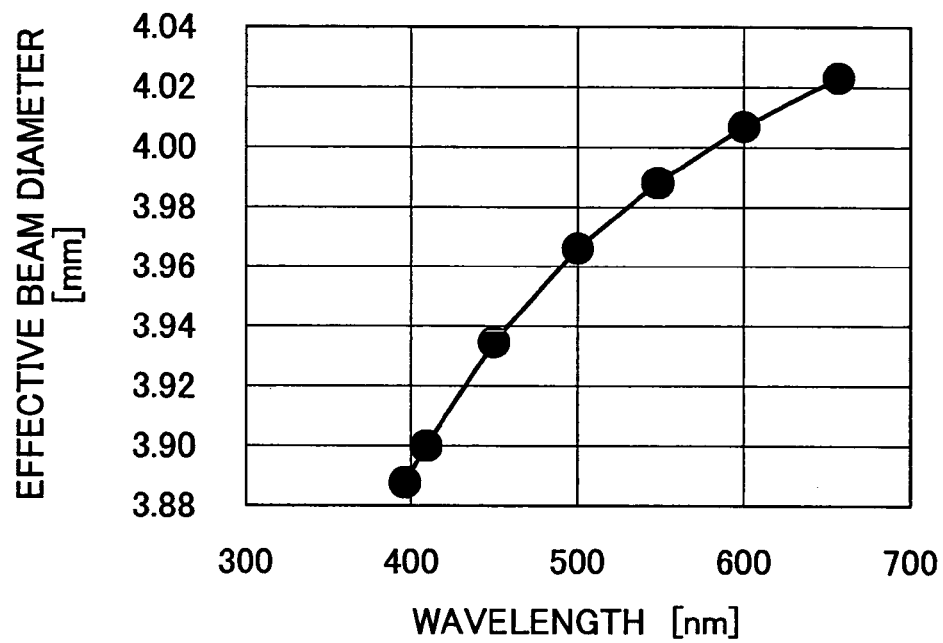
FIG. 14A is a graph showing a relation between the wavelength and the effective diameter of the incident light beam.

FIG. 14A is a graph showing a relation between the wavelength and an effective diameter $\phi 2$ of the incident light beam under the conditions that the diameter $\phi 1$ of the incident beam is 3.9 mm in the blue wavelength region, the numerical aperture NA is 0.65, the focal length f is 3.0 mm, and the material of the object lens is BaCD5.

As shown in FIG. 14A, it is necessary to set the beam diameter $\phi 2$ to be about 4.02 mm when using the red light having a wavelength of 660 nm to record data or reproduce data in a DVD-type optical recording medium.

Figure 14B:
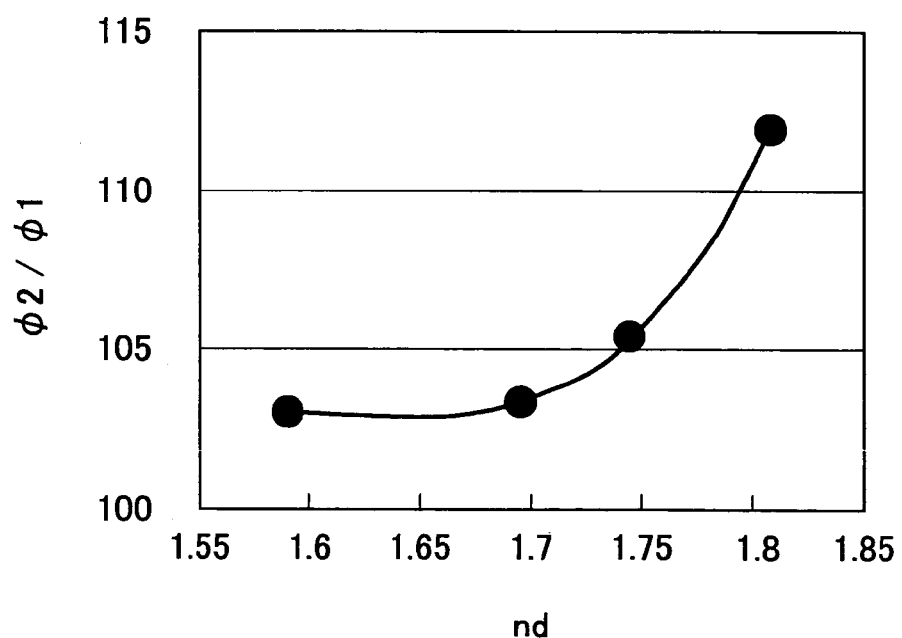
FIG. 14B is a graph showing a relation between the ratio of beam diameters and the refractive index of the d-line of the sodium spectrum in various glass materials of the object lens.

FIG. 14B is a graph showing a relation between a ratio ($\phi 2/\phi 1$) of beam diameters and a refractive index of the d-line of the sodium spectrum in various glass materials of the object lens, under the same conditions as in FIG. 14A, that is, the diameter $\phi 1$ of the incident beam is 3.9 mm in the blue wavelength region, the numerical aperture NA is 0.65, and the focal length f is 3.0 mm.

As shown in FIG. 14B, the ratio of the beam diameters ($\phi 2/\phi 1$) depends on the material of the object lens. Therefore, it is sufficient to select an appropriate beam diameter $\phi 2$ according to the material of the object lens.

On the other hand, the optimal numerical aperture (NA) for recording or reproducing data in the CD-type optical recording medium 109c is 0.5. Using the graph in FIG. 14A to estimate the optimum beam diameter $\phi 3$, it is found that the optimum beam diameter $\phi 3$ may be set to be about 3 mm.

Because the optimum beam diameters $\phi 1$, $\phi 2$, and $\phi 3$ in different wavelength regions are different, it is necessary to perform three-stage NA switching corresponding to the beam diameters $\phi 1$, $\phi 2$, and $\phi 3$.

In the present embodiment, $\phi 2$ is limited by the opening 105 formed on the actuator, and switching of $\phi 1$ and $\phi 3$ are achieved by using a switching element in the phase correction element 107.

As already described above, the phase correction element 107 of the present embodiment includes a diffraction pattern superposed on a phase shifting pattern. The diffraction pattern, which is wavelength sensitive, changes beam diameters by diffraction according to wavelengths of the incident light beams from the light sources.

FIGS. 15A through 15C are views each showing a portion of the optical pickup for NA switching, with the incident light beams in the blue, red, and infrared wavelength regions, respectively ($\phi 2 > \phi 1 > \phi 3$).

In the center area of the phase correction element 107, corresponding to a beam diameter less than $\phi 3$, because a diffraction grating is not provided in this area, center portions of the respective blue, red, and infrared light beams transmit through this area without diffraction.

In the peripheral area of the phase correction element 107, corresponding to a beam diameter from $\phi 3$ to $\phi 1$, the blue and red light beams are not diffracted, but the infrared light beam is diffracted.

In the further peripheral area of the phase correction element 107, corresponding to a beam diameter from $\phi 1$ to $\phi 2$, the red light beam is not diffracted, but the blue and the infrared light beams are diffracted.

With the diffraction pattern shown in FIG. 6B, which is a diffraction grating including periodically arranged grooves, a phase difference is generated for the incident light beam. By controlling the phase difference to be an integral multiple of $2\pi$ for light beams having wavelengths desired to be selectively transmitted (407 nm, 660 nm), diffraction efficiencies are low for the light beams having wavelengths of 407 nm and 660 nm, but high for the light beam having a wavelength of 780 nm.

Figure 16A:
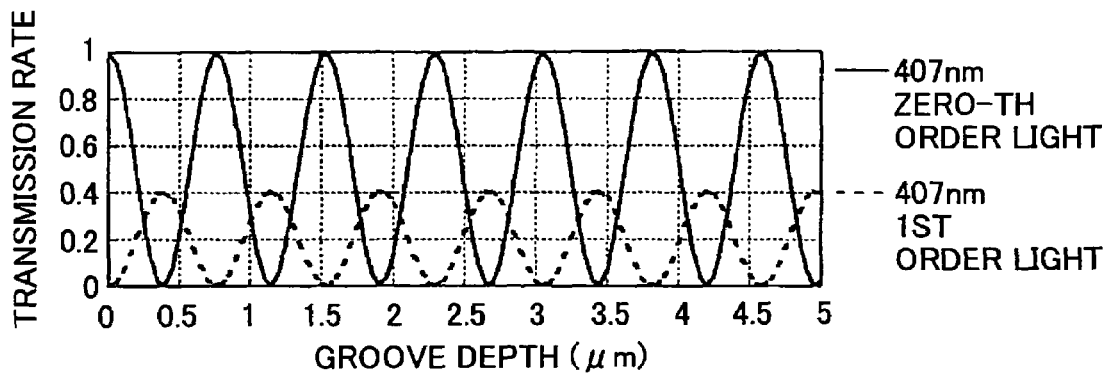
FIG. 16A shows dependence of a transmission rate of the zero-th order diffracted light having a wavelength of 407 nm, through the diffraction gratings including periodically arranged grooves, and a diffraction efficiency of the first order diffracted light, on the depth of the grooves.

FIG. 16A shows a dependence of a transmission rate of the zero-th order diffracted light, whose wavelength is 407 nm, through the diffraction gratings having the periodically arranged grooves, and a diffraction efficiency of the first order diffracted light, on the depth of the grooves.

Figure 16B:
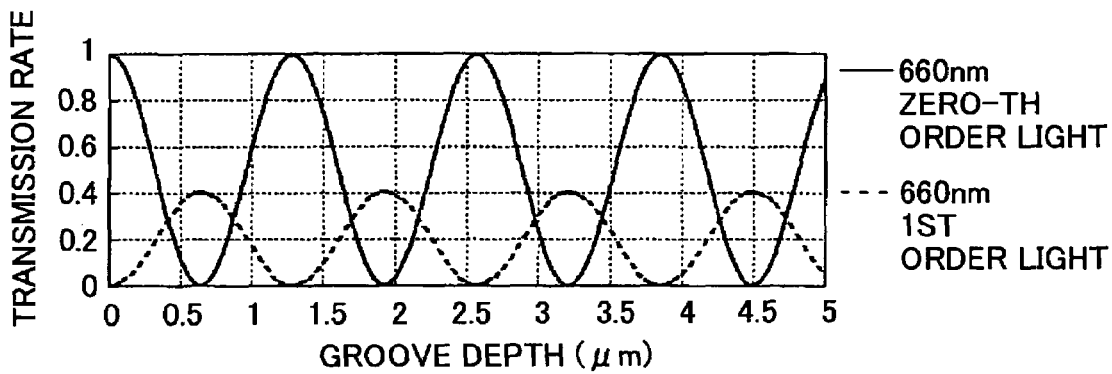
FIG. 16B shows dependence of a transmission rate of the zero-th order diffracted light having a wavelength of 660 nm, through the diffraction gratings including periodically arranged grooves, and a diffraction efficiency of the first order diffracted light, on the depth of the grooves.
Figure 16C:
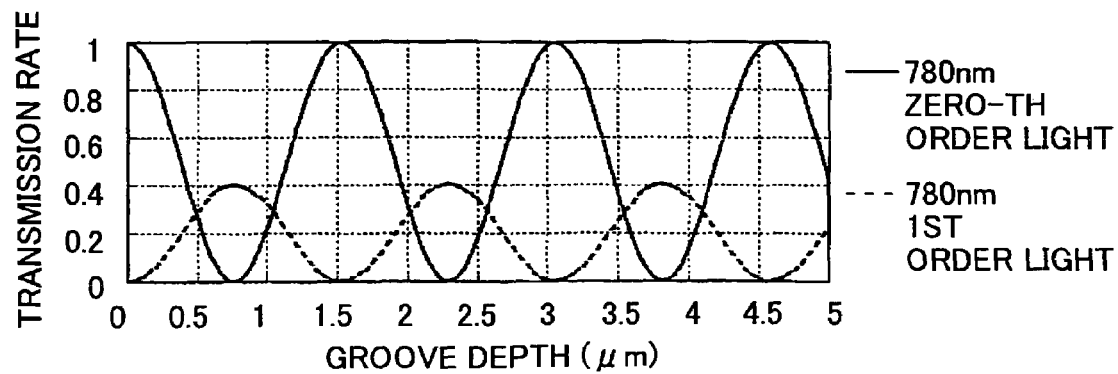
FIG. 16C shows dependence of a transmission rate of the zero-th order diffracted light having a wavelength of 780 nm, through the diffraction gratings including periodically arranged grooves, and a diffraction efficiency of the first order diffracted light, on the depth of the grooves.

FIGS. 16B and 16C show the same graphs as FIG. 16A with the wavelengths of the incident light beams set to be 660 nm and 780 nm, respectively.

As shown in FIGS. 16A through 16C, with the depth of the grooves near 3.8 μm, the transmission rates of the zero-th order light having wavelengths of 407 nm and 660 nm are close to 100%, but the transmission rate of the zero-th order light having a wavelength of 780 nm is close to zero.

With the depth of the grooves near 2.6 μm, the transmission rate of the zero-th order light having a wavelength of 660 nm is close to 100%, but the transmission rates of the zero-th order light having wavelengths of 407 nm and 780 nm are below 30%.

The depth of the grooves of the diffraction pattern may be set to be near 3.8 μm in the peripheral area related to a beam diameter from $\phi 3$ to $\phi 1$, as shown in FIGS. 15A through 15C, and the depth of the grooves of the diffraction pattern may be set to be near 2.6 μm in the peripheral area related to a beam diameter larger than $\phi 1$ as shown in FIGS. 15A through 15C. Because a shallow depth of the grooves results in a high yield, the depth is selected to be the minimum common multiplier of the desired phase differences. In addition, although the transmission rates of the zero-th order light having wavelengths of 407 nm and 780 nm are below 30% when the depth of the grooves is near 2.6 μm, because the incident light beam is concentrated in the transmitting center region, and only the peripheral portion of the light beam is diffracted by the NA switching operation, there is not any substantial influence.

The light beam propagating toward the optical recording medium is diffracted by diffraction gratings formed in the diffraction pattern of the phase correction element, and further propagates toward the optical recording medium. Afterwards, the light beam is reflected by the optical recording medium, and returns to the phase correction element, and is diffracted again by the diffraction gratings. Because this returning light appears as noise if it arrives at the light reception element, it is desirable that the diffraction pattern with the diffraction gratings be designed such that light spot is not focused on the light reception element.

The width of the gratings of the diffraction pattern relates to the diffraction angle of the incident light beam, and can be adjusted according to arrangement positions limited by the shape and size of the light reception element, the distance to the object lens, or the like, while considering the wavelength difference of the incident light, which is introduced for achieving compatibility with the blue-light, DVD, and CD-type optical recording media.

In the present embodiment, the ¼ wavelength plate 106 is provided in the optical pickup for converting the light beam having a wavelength of 407 nm from linearly-polarized light to circularly-polarized light, and converting the light beams having wavelengths of 660 nm and 780 nm from linearly-polarized light to circularly or elliptically-polarized light, or converting the light beams having wavelengths of 660 nm and 780 nm from circularly or elliptically-polarized light to linearly-polarized light.

When configuring the ¼ wavelength plate 106, it may be required to satisfy the following equations 6, 7, or 8. That is, the phase difference between the ordinary beam, whose refractive index is no, and the extraordinary beam, whose refractive index is ne, corresponds to a quarter of the wavelengths of the 407 nm, 660 nm, and 780 nm light beams at a certain thickness in the ¼ wavelength plate 106.

$$\Delta n1 \times t = \{(2p+1)\} \times 407 \ (p=0, 1, \dots) \quad (6)$$

where Δn1 equals no−ne for the light beam having a wavelength of 407 nm.

$$\Delta n2 \times t = \{(2q+1)\} \times 407 \ (q=0, 1, \ldots) \quad (7)$$

where Δn2 equals no−ne for the light beam having a wavelength of 660 nm.

$$\Delta n3 \times t = \{(2r+1)\} \times 780 \ (r=0, 1, \ldots) \quad (8)$$

where Δn3 equals no−ne for the light beam having a wavelength of 780 nm.

When satisfying all of the equations 6, 7, and 8, the wavelength plate 106 is capable of converting the light beams having wavelengths of 407 nm, 660 nm, and 780 nm from linearly-polarized light to circularly-polarized light, or converting the light beams having wavelengths of 407 nm, 660 nm, and 780 nm from circularly-polarized light to linearly-polarized light.

When requiring the wavelength plate 106 to convert the light beams having wavelengths of 407 nm and 660 nm from linearly-polarized light to circularly-polarized light or from circularly-polarized light to linearly-polarized light, and to convert the light beam having a wavelength of 780 nm from linearly-polarized light to elliptically-polarized light, it is sufficient to configure the wavelength plate 106 to satisfy equations 6 and 7.

When requiring the wavelength plate 106 to convert the light beam having a wavelength of 407 nm from linearly-polarized light to circularly-polarized light or from circularly-polarized light to linearly-polarized light, and to convert the light beams having wavelengths of 660 nm and 780 nm from linearly-polarized light to elliptically-polarized light, it is sufficient to configure the wavelength plate 106 to satisfy equation 6.

In the light paths of the DVD- or CD-related optical systems, the hologram units 201, 301b are arranged as illustrated in FIG. 2. If the hologram units 201, 301b are incapable of polarization, the forward light path and the backward light path cannot be separated sufficiently; as a result, about 30% of the returning light reflected by the optical recording medium arrives at the semiconductor laser. This returning light appears as noise, and makes the oscillation condition of the semiconductor laser unstable.

In the present embodiment, because the wavelength plate 106 as described above is arranged, for example, the light beam from the hologram unit 201 and the light beam propagating toward the hologram unit 201 after being reflected on the optical recording medium turn out to be orthogonal to each other in the polarization directions. By setting the forward light beam to be orthogonal to the backward light beam in the polarization directions, it is possible to prevent noise generation due to returning of light to the semiconductor laser 201a.

In addition, because the wavelength plate 106 is arranged in the optical pickup, the combination of the polarized beam splitter 103 and the wavelength plate 106 acts as a polarized beam splitting system for the DVD-type optical recording medium. This results in a sufficient amount of light, and makes it possible to prevent noise generation caused by the returning light on the semiconductor laser 201a.

The wavelength plate 106 may be formed from crystals satisfying the equations 6, 7 and 8, or by sandwiching, by glass plates, a stacked structure of phase shift elements made from organic materials. Alternatively, a liquid crystal element or other electro-optical element may also be used.

Figure 17:
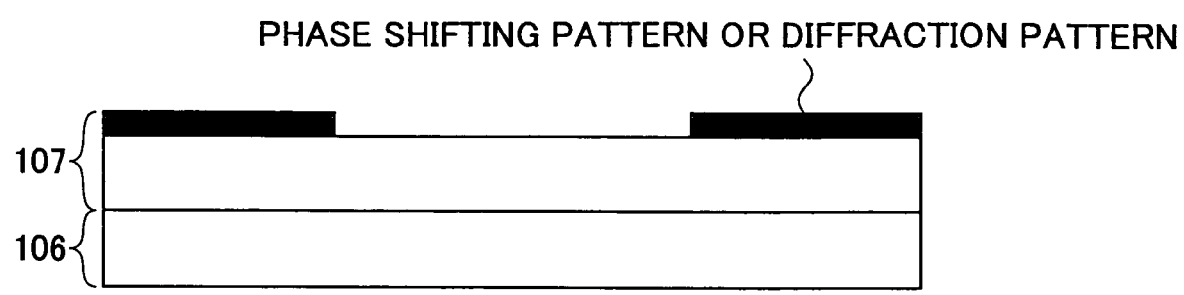
FIG. 17 is a cross-sectional view showing an example of a structure of the wavelength plate 106 according to the first embodiment.

FIG. 17 is a view showing an example of a structure of the wavelength plate 106.

As illustrated in FIG. 17, the ¼ wavelength plate 106 and the phase correction element 107 may be combined integrally. In this way, the assembly process may be simplified.

Second Embodiment

Similar to the first embodiment, the optical pickup of the present embodiment is able to record, reproduce or erase data to or from a blue-light optical recording medium, a DVD-type optical recording medium, and a CD-type optical recording medium. The blue-light optical recording medium uses a light source emitting a light beam having a wavelength of 407 nm in the blue wavelength region, corresponds to a numerical aperture (NA) equaling 0.70, and has a substrate thickness equaling 0.6 mm on the light irradiation side. The DVD-type optical recording medium uses a light source emitting a light beam having a wavelength of 660 nm, corresponds to a numerical aperture equaling 0.65, and uses a substrate thickness equaling 0.6 mm on the light irradiation side. The CD-type optical recording medium uses a light source emitting a light beam having a wavelength of 780 nm, corresponds to a numerical aperture equaling 0.50, and has a substrate thickness equaling 1.2 mm on the light irradiation side.

The optical pickup of the present embodiment differs from that of the first embodiment in the aspect that in the blue-light-related optical system, the numerical aperture NA is not 0.65 but 0.70, and the beam diameter of the incident blue light beam is larger than that of the incident red light beam for the DVD-type optical recording medium.

In the following description, the same reference numerals are used for the same elements as in the first embodiment.

In the present embodiment, $\phi 1$ is limited by the opening 105 formed on the actuator, and switching of $\phi 2$ and $\phi 3$ are achieved by using a switching element in the phase correction element 107. The phase correction element 107 of the present embodiment includes a diffraction pattern superposed on a phase shifting pattern. The diffraction pattern, which is a wavelength sensitive, changes beam diameters by means of diffraction according to wavelengths of the incident light beams from the light sources.

Figure 18:
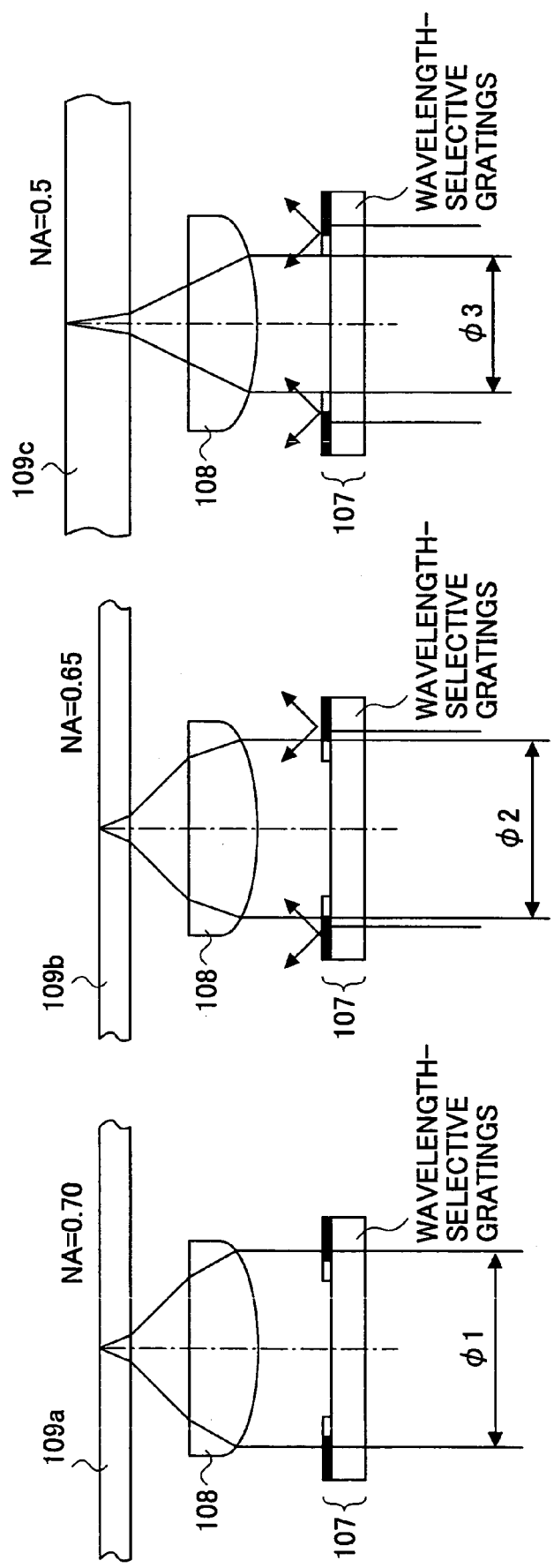
FIGS. 18A through 18C are views each showing a portion of the optical pickup for NA switching, with the incident light beams in the blue, red, and infrared wavelength regions, respectively ($\phi1>\phi2>\phi3$), according to a second embodiment.

FIGS. 18A through 18C are views each showing a portion of the optical pickup for NA switching, with the incident light beams in the blue, red, and infrared wavelength regions, respectively ($\phi 1 > \phi 2 > \phi 3$).

In the center area of the phase correction element 107, corresponding to a beam diameter less than $\phi 3$, because a diffraction grating is not provided in this area, center portions of the respective blue, red, and infrared light beams transmit this area without diffraction.

In the peripheral area of the phase correction element 107, corresponding to a beam diameter from $\phi 3$ to $\phi 2$, the blue and red light beams are not diffracted, but the infrared light beam is diffracted.

In the further peripheral area of the phase correction element 107, corresponding to a beam diameter from $\phi 2$ to $\phi 1$, the red light beam is not diffracted, but the blue and the infrared light beams are diffracted.

Third Embodiment

Similar to the previous embodiment, the optical pickup of the present embodiment is able to record, reproduce or erase data to or from a blue-light optical recording medium, a DVD-type optical recording medium, and a CD-type optical recording medium. The blue-light optical recording medium uses a light source emitting a light beam having a wavelength of 407 nm in the blue wavelength region, corresponds to a numerical aperture (NA) equaling 0.67, and has a substrate thickness equaling 0.6 mm on the light irradiation side. The DVD-type optical recording medium uses a light source emitting a light beam having a wavelength of 660 nm, corresponds to a numerical aperture equaling 0.65, and uses a substrate thickness equaling 0.6 mm on the light irradiation side. The CD-type optical recording medium uses a light source emitting a light beam having a wavelength of 780 nm, corresponds to a numerical aperture equaling 0.50, and has a substrate thickness equaling 1.2 mm on the light irradiation side.

With an object lens being designed to produce an optimum wave front in the blue wavelength region, if a red light beam having a beam diameter the same as that of a blue light beam is incident on the object lens by infinite incidence, the refractive power of the object lens decreases, and accordingly the numerical aperture (NA) decreases. Conversely, the numerical aperture (NA) increases when the blue light beam transmits through, in comparison with the red light beam. Therefore, by using the blue light, it is possible to realize an optical pickup capable of shortening the wavelength of the incident light beam and increasing the storage capacity of the corresponding recording medium. By the way, for a DVD-related optical system, the numerical aperture is set to be near 0.65.

Figure 19:
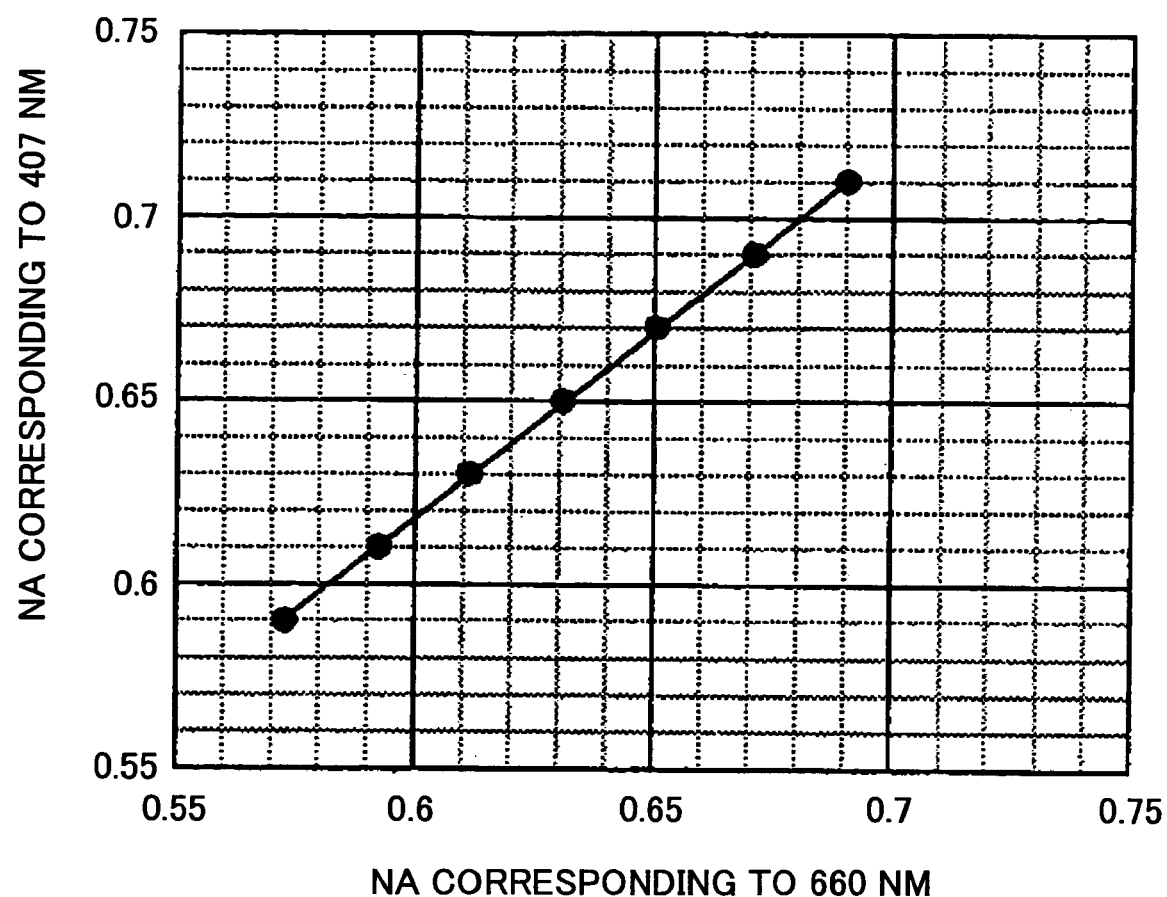
FIG. 19 graphs a relation between the numerical aperture (NA) for transmitting a light beam having a wavelength of 407 nm and the numerical aperture for transmitting a light beam having a wavelength of 660 nm according to a third embodiment.

FIG. 19 shows a relation between the numerical aperture (NA) for transmitting a 407 nm blue light beam and the numerical aperture for transmitting a 660 nm red light beam, under the conditions that the diameter of the incident beam is 3.9 mm, the material of the object lens is BaCD5 manufactured by HOYA company, and the substrate thickness of the optical recording medium is 0.6 mm.

As illustrated in FIG. 19, if the numerical aperture is 0.65 for transmitting the red light beam which is used for the DVD-type optical recording medium, the numerical aperture is 0.67 for transmitting the blue light beam having the same beam diameter as that of the red light beam.

By using this relation, it is not necessary to perform three-stage NA switching as described in the previous embodiments, and a two-stage NA switching operation is sufficient, as done in the optical pickups of the related art, which is compatible with DVD and CD-type optical recording media. In doing so, the structure of the optical pickup can be simplified.

In the present embodiment, NA switching is performed by using a switching element in the phase correction element 107. The phase correction element 107 of the present embodiment includes a diffraction pattern superposed on a phase shifting pattern. The diffraction pattern includes a wavelength-sensitive grating, whereby beam diameters are changed by means of diffraction according to wavelengths of the incident light beams from the light sources.

Figure 20:
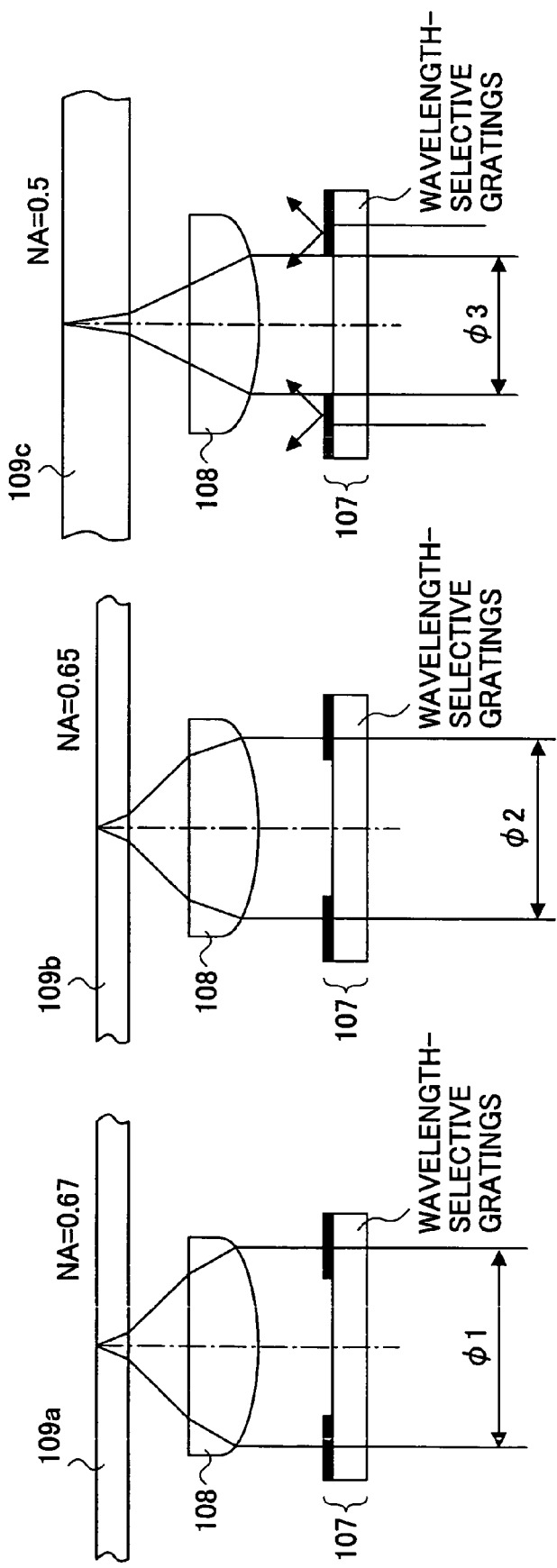
FIGS. 20A through 20C are views each showing a portion of the optical pickup for NA switching, with the incident light beams in the blue, red, and infrared wavelength regions, respectively ($\phi1=\phi2>\phi3$) according to the third embodiment.

FIGS. 20A through 20C are views each showing a portion of the optical pickup for NA switching, with the incident light beams in the blue, red, and infrared wavelength regions, respectively ($\phi 1 = \phi 2 > \phi 3$).

In the center area of the phase correction element 107, corresponding to a beam diameter less than $\phi 3$, because a diffraction grating is not provided in this area, center portions of the respective blue, red, and infrared light beams transmit through this area without diffraction.

In the peripheral area of the phase correction element 107, corresponding to a beam diameter from $\phi 3$ to $\phi 2 (= \phi 1)$, the blue and red light beams are not diffracted, but the infrared light beam is diffracted.

Fourth Embodiment

Figure 21:
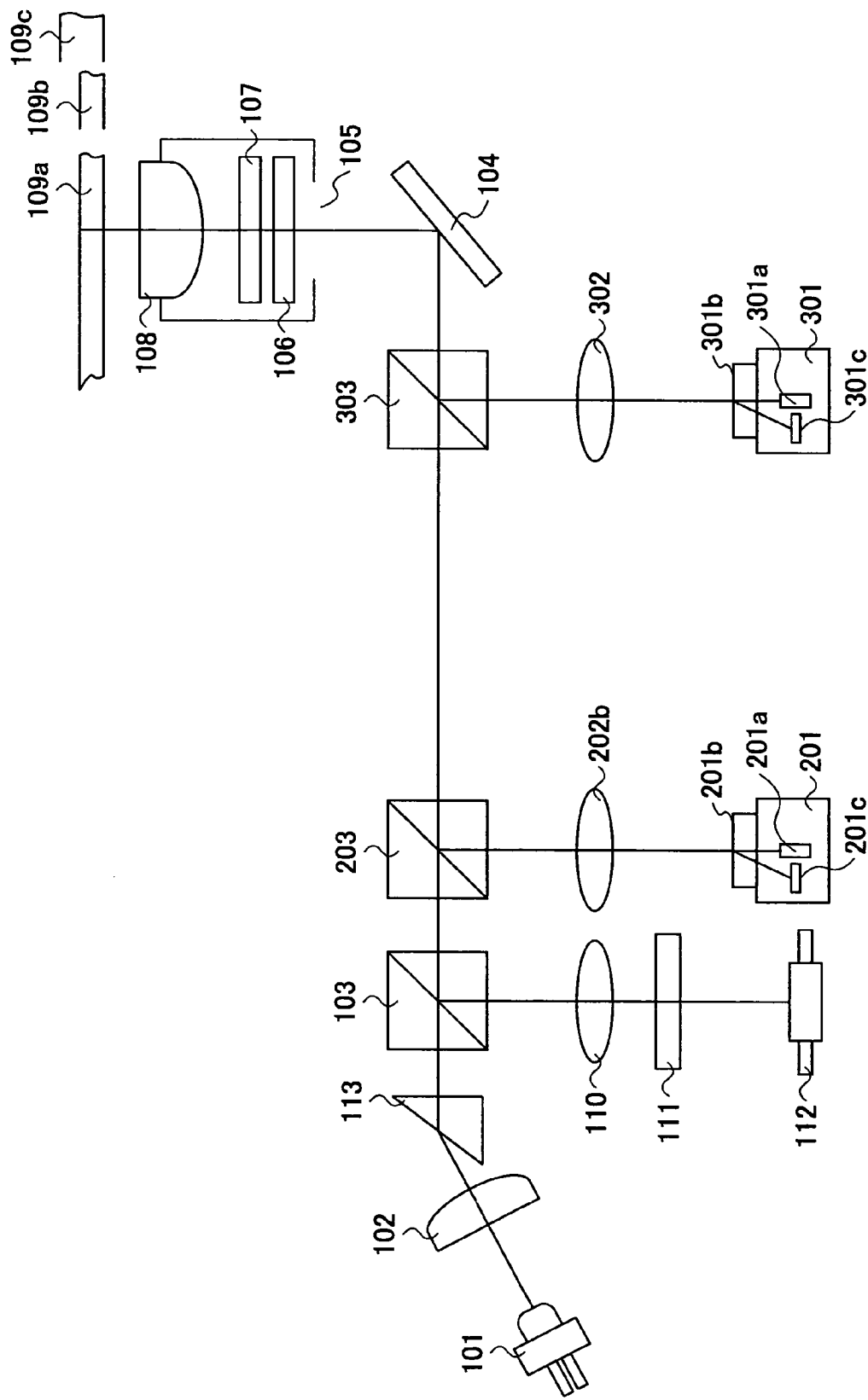
FIG. 21 is a schematic diagram showing a configuration of an optical pickup according to a fourth embodiment of the present invention.

FIG. 21 is a block diagram schematically showing a configuration of an optical pickup according to a fourth embodiment of the present invention. The optical pickup of the present embodiment is able to record, reproduce or erase data to or from a blue-light optical recording medium, a DVD-type optical recording medium, and a CD-type optical recording medium.

The blue-light optical recording medium uses a light source emitting a light beam having a wavelength of 407 nm in the blue wavelength region, corresponds to a numerical aperture (NA) equaling 0.67, and has a substrate thickness equaling 0.6 mm on the light irradiation side. The DVD-type optical recording medium uses a light source emitting a light beam having a wavelength of 660 nm, corresponds to a numerical aperture equaling 0.65, and uses a substrate thickness equaling 0.6 mm on the light irradiation side. The CD-type optical recording medium uses a light source emitting a light beam having a wavelength of 780 nm, corresponds to a numerical aperture equaling 0.50, and has a substrate thickness equaling 1.2 mm on the light irradiation side.

The optical pickup of the present embodiment differs from that of the first embodiment in the aspect that finite incidence but not infinite incidence is employed in the DVD-related optical system, and instead of the collimator lens 202 in FIG. 2, a coupling lens 202b is provided for directing a divergent light beam from the light source to the object lens 108 at a specified magnification factor.

In the optical pickup of the present embodiment, being different from those of the previous embodiments, the DVD-related optical system includes a finite incidence system, and the numerical apertures are limited by the opening 105 in the blue-light optical system and the DVD-related optical system, respectively, as done in the third embodiment. While, in the optical pickup of the present embodiment, being different from that of the third embodiment, the desired value of the numerical aperture of the blue-light optical system is selectable. Further, the optical pickup of the present embodiment results in higher wave front performance than in the previous embodiments, in which both finite incidence and phase shift are used to correct the spherical aberration generated in the DVD-related optical system.

Figure 22:
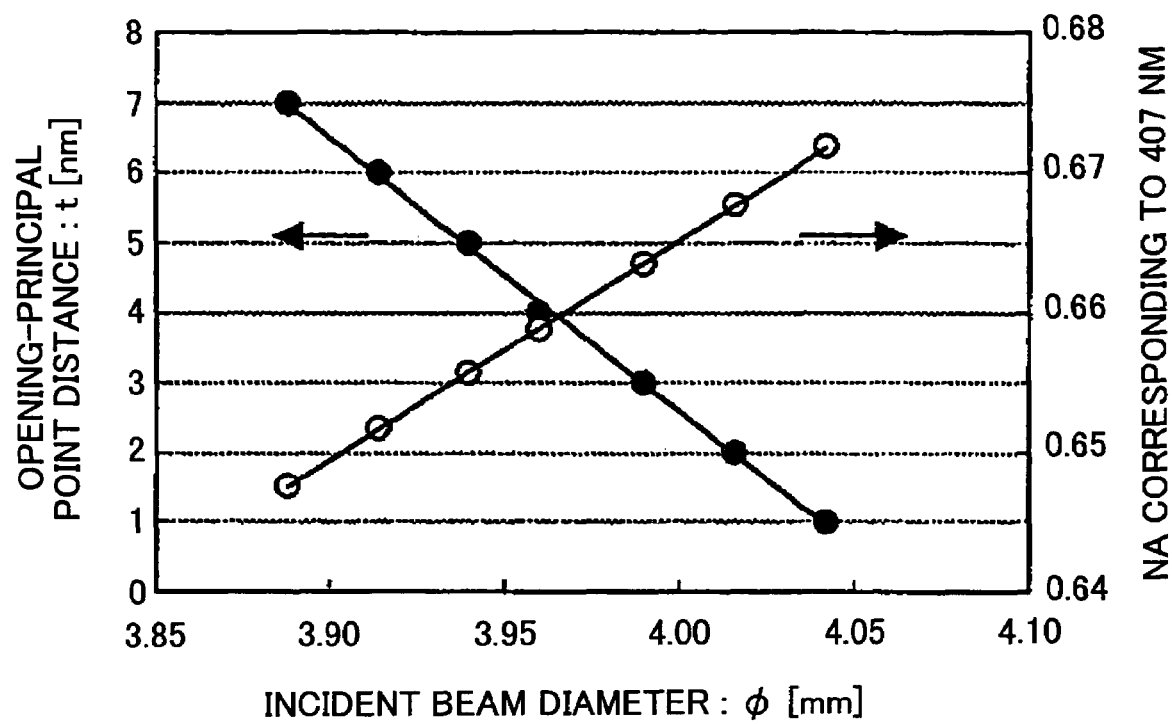
FIG. 22 shows a relation between the beam diameter (X axis) of a red light beam and a distance (Y axis on the left side) from the opening 105 to the front principal point of the object lens 108, and a relation between the beam diameter (X axis) of a blue light beam and a corresponding numerical aperture (Y axis on the right side)

FIG. 22 shows a relation between the beam diameter (X axis) of a red light beam and a distance (Y axis on the left side) from the opening 105 to the front principal point of the object lens 108, and a relation between the beam diameter (X axis) of a blue light beam and a corresponding numerical aperture (Y axis on the right side), under the conditions that the material of the object lens is BaCD5 manufactured by HOYA company, and the substrate thickness of the optical recording medium is 0.6 mm.

In FIG. 22, the Y axis on the left side represents the distance from the opening 105 to the front principal point of the object lens 108 required for the DVD-related optical system to have a numerical aperture of 0.65 with the corresponding beam diameter indicated by the X axis, when a red light beam having a wavelength of 660 nm transmits through the object lens 108.

The Y axis on the right side represents the numerical aperture of the blue-light optical system corresponding to the beam diameter indicated by the X axis, when a blue light beam having a wavelength of 407 nm transmits through the object lens 108.

From the graphs in FIG. 22, because the numerical aperture NA is 0.67 for recording and reproducing data in a blue-light optical recording medium in the present embodiment, the optimum beam diameter of the incident light beam is φ=4.03 mm, and the distance t from the opening 105 to the front principal point of the object lens 108 is 1.44 mm.

A detailed description is given below.

The optical pickup of the present embodiment has a light source emitting light having a wavelength λ1=407 nm, a light source emitting light having a wavelength λ2=660 nm, and a single object lens for condensing light from the light sources to optical recording media. Light from the light source emitting 407 nm light is incident by infinite incidence when the light source emitting 407 nm light is turned ON, and light from the light source emitting 660 nm light is incident by finite incidence when the light source emitting 660 nm light is turned ON. An opening is placed at a certain distance t from the front principal point of the object lens on the side of the light source. The distance t can be determined by the equation 9.

$$t = L - NA1 * f/\tan(a\sin(NA2obj)) \quad (9)$$

where, f is the focal length of the object lens, NA1 is the NA on the image side when the 407 nm (λ1) light source is turned ON, NA2 obj is the numerical aperture on the object side when the 660 nm (λ2) light source is turned ON, and L is the object distance when the 660 nm light source is turned ON.

Therefore, it is not necessary to switch NA corresponding to the 407 nm (λ1) light and the 660 nm (λ2) light.

Figure 23:
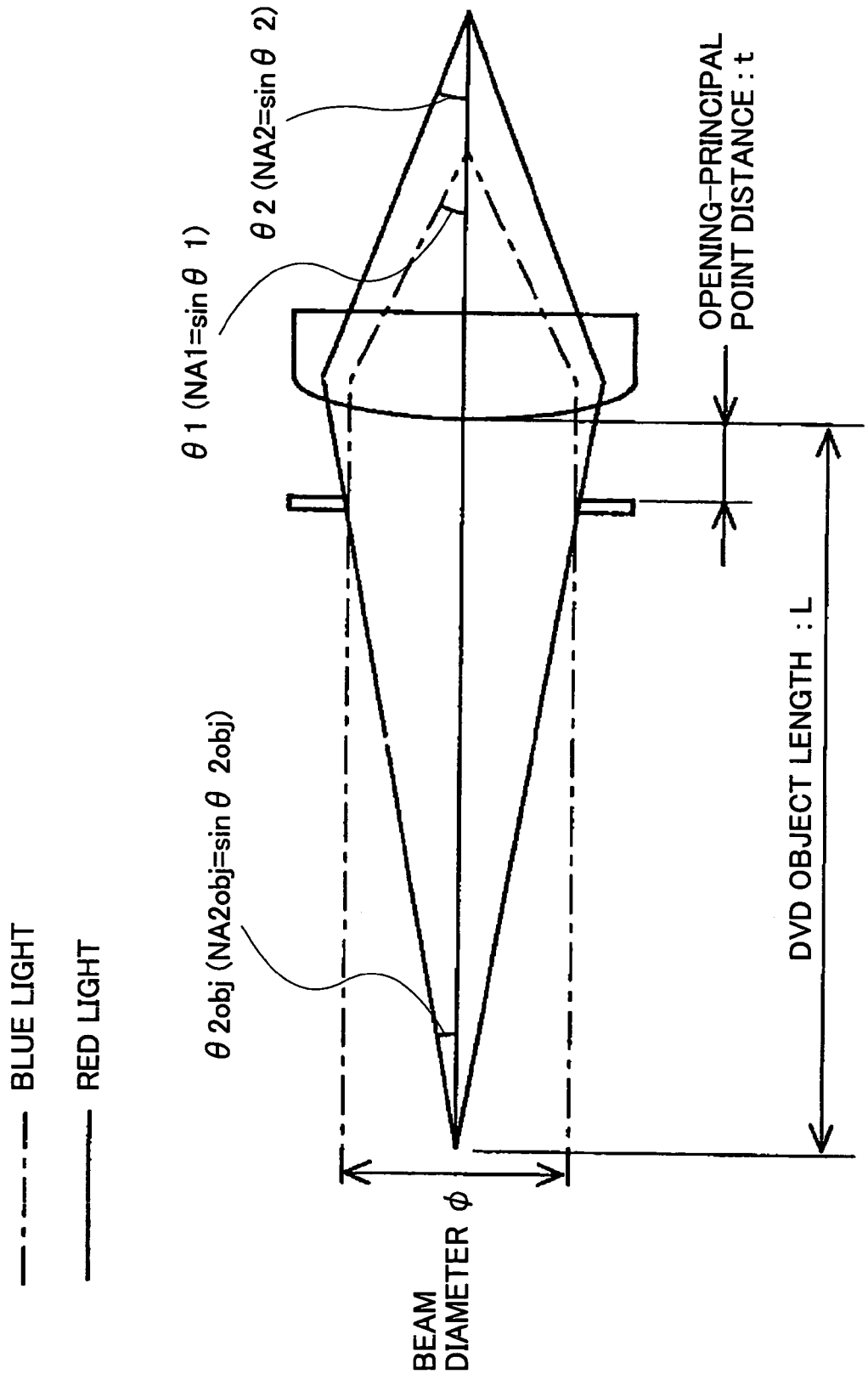
FIG. 23 is a schematic diagram showing light paths to the focus point of the object lens when a parallel light beam or a diverging light beam passes through an opening according to the fourth embodiment.

FIG. 23 is a diagram showing light paths to the focus point of the object lens when a light beam passes through an opening and an infinite incidence system or a finite incidence system.

In FIG. 23, the one-dot chain lines represent light paths of a light beam of a wavelength (λ1), a numerical aperture NA1, and propagating in an infinite incidence system. The following equation 10 is well known in relating the focal length f of the object lens, the beam diameter φ of the incident light beam, and the numerical aperture NA1.

$$NA1 = \phi/2/f \quad (10)$$

On the other hand, the solid lines represent the light path of a light beam of a wavelength (λ2), a numerical aperture NA2, and propagating in an infinite incidence system having an object distance L and a numerical aperture NA2 obj on the object side. The position of the opening is at a distance t from the front principal point of the object lens on the side of the light source so that the beam diameter of a wavelength λ2 is φ. These quantities satisfy the following equation 11.

$$\phi/2 = (L-t) * \tan(a\sin(NA2obj)) \text{tm} \quad (11)$$

Incorporating equation 11 into equation 10, equation 9 can be obtained.

As an exemplary configuration in the present embodiment, λ1=407 nm, NA1=0.67 in the blue-light-related optical system, λ2=660 nm, NA2=0.65, L=157 mm, NA2 obj=0.013 in the DVD-related optical system, and the resulting beam diameter φ is 4.03 mm, and t=1.44 mm.

Further, if a diffraction pattern is provided that causes only the peripheral portion of the light beam to be diffracted in the CD-related optical system, as explained in the third embodiment with reference to FIGS. 20A through 20C, it is possible to obtain compatibility for the three types of optical recording media.

As already described with reference to FIG. 8B in the first embodiment, with an object lens being designed to produce a minimum spherical aberration at a wavelength of 407 nm, when a light beam having a wavelength of 660 nm is incident on the object lens by infinite incidence to form a spot on the DVD-type optical recording medium, a spherical aberration occurs due to the difference of the light wavelengths (406 nm and 660 nm). In addition, FIG. 7B shows the spherical aberration related to the 407 nm blue light.

In the present embodiment, in order to produce a spherical aberration having a sign opposite to the spherical aberration as shown in FIG. 8B, a finite incidence system is constructed in the DVD-related optical system and the phase shift pattern 107 including a phase shift pattern is provided.

In a finite incidence system, the light beam incident on the object lens is converted to be diverging or focusing. Generally, changing a diverging state of the light beam incident on the object lens is equivalent to changing the spherical aberration. Therefore, it is sufficient to select a diverging state so as to reduce the spherical aberration.

Figure 24:
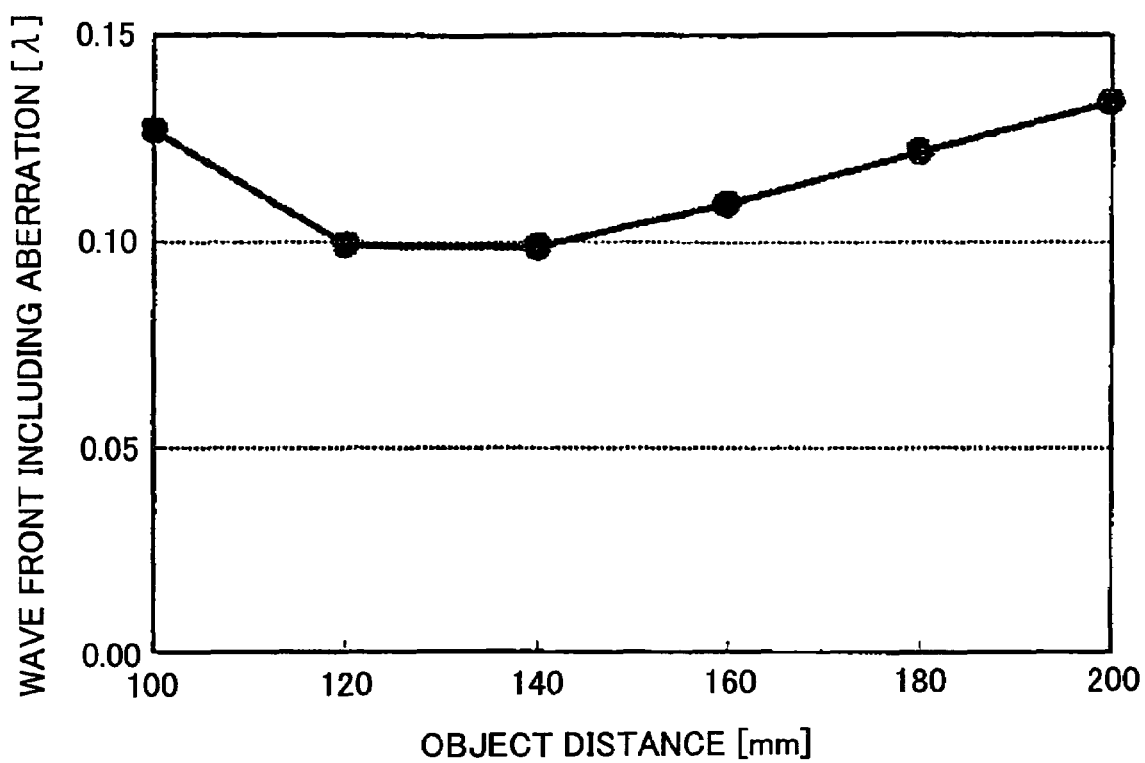
FIG. 24 graphs a relation between an object distance and the aberration according to the fourth embodiment.

FIG. 24 shows a relation between an object distance in a DVD-related optical system including a finite incidence system and the aberration.

As shown in FIG. 24, by changing the object distance, which corresponds to the distance between the light source and the object lens, the aberration can be suppressed. According to FIG. 24, degradation of the wave front is small when the object distance is in the range from 110 mm to 160 mm.

Here, it is assumed that there are no other parts between the object lens and the light source, but in practice, the coupling lens 202*b* and so on are arranged between the object lens and the light source, which shortens the light path.

However, it is still not sufficient for suppressing the aberration in the DVD-related optical system by only the finite incidence. In the present embodiment, in addition to constructing the finite incidence system, the phase shift pattern of the phase shift pattern 107 is also used to further suppress the aberration.

Figure 25A:
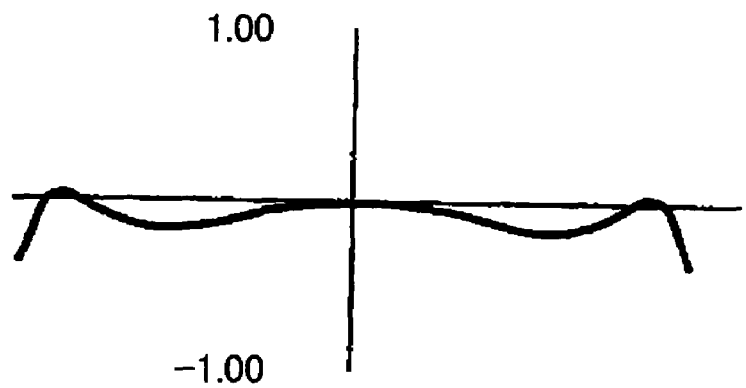
FIG. 25A graphs a wave front including a residual spherical aberration in the DVD-related optical system with the incident light beam to be diverging.

FIG. 25A shows the wave front including the residual spherical aberration in the DVD-related optical system including the finite incidence system.

Figure 25B:
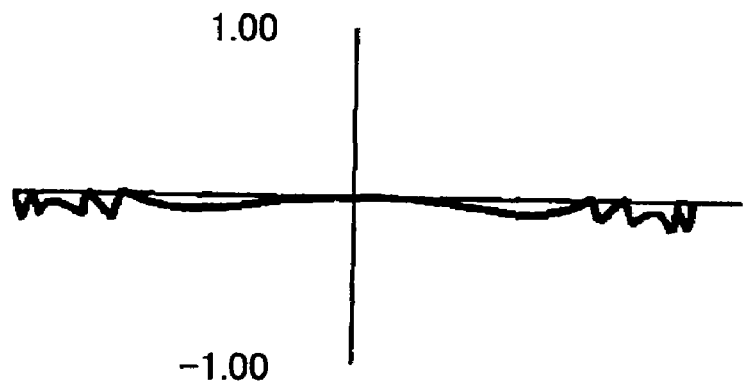
FIG. 25B graphs the wave front with residual the spherical aberration in FIG. 25A being corrected by using a phase shift pattern for producing an aberration having a sign opposite to the residual spherical aberration shown in FIG. 25A.

FIG. 25B shows the wave front with residual the spherical aberration in FIG. 25A being corrected by using a phase shift pattern for producing an aberration having a sign opposite to the residual spherical aberration.

Figure 26:
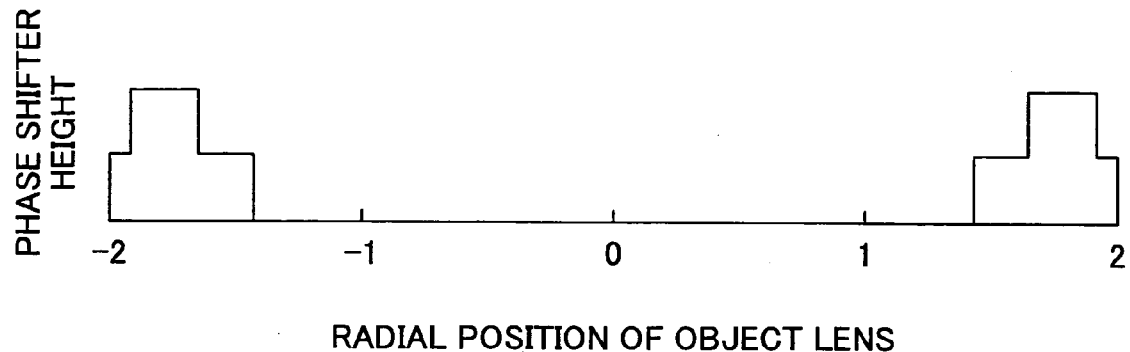
FIG. 26 is a view showing a cross section of the phase shift pattern for producing the aberration having a sign opposite to the residual spherical aberration shown in FIG. 25A according to the fourth embodiment.

FIG. 26 is a view showing a cross section of the phase shift pattern for producing the aberration having a sign opposite to the residual spherical aberration as shown in FIG. 25A.

The phase shift pattern in FIG. 26 is used to produce the aberration having a sign opposite to the residual spherical aberration shown in FIG. 25B. With the phase shift pattern in FIG. 26, the wave front with residual the spherical aberration in FIG. 25A is corrected, as shown in FIG. 25B.

In FIG. 25B, the aberration is about 0.03 λrms, it is smaller than 0.05 λrms, which is obtained in the first embodiment, and satisfies the practical requirement of 0.03 λrms. Therefore, good spots can be formed on the DVD-type optical recording medium.

Fifth Embodiment

Figure 27:
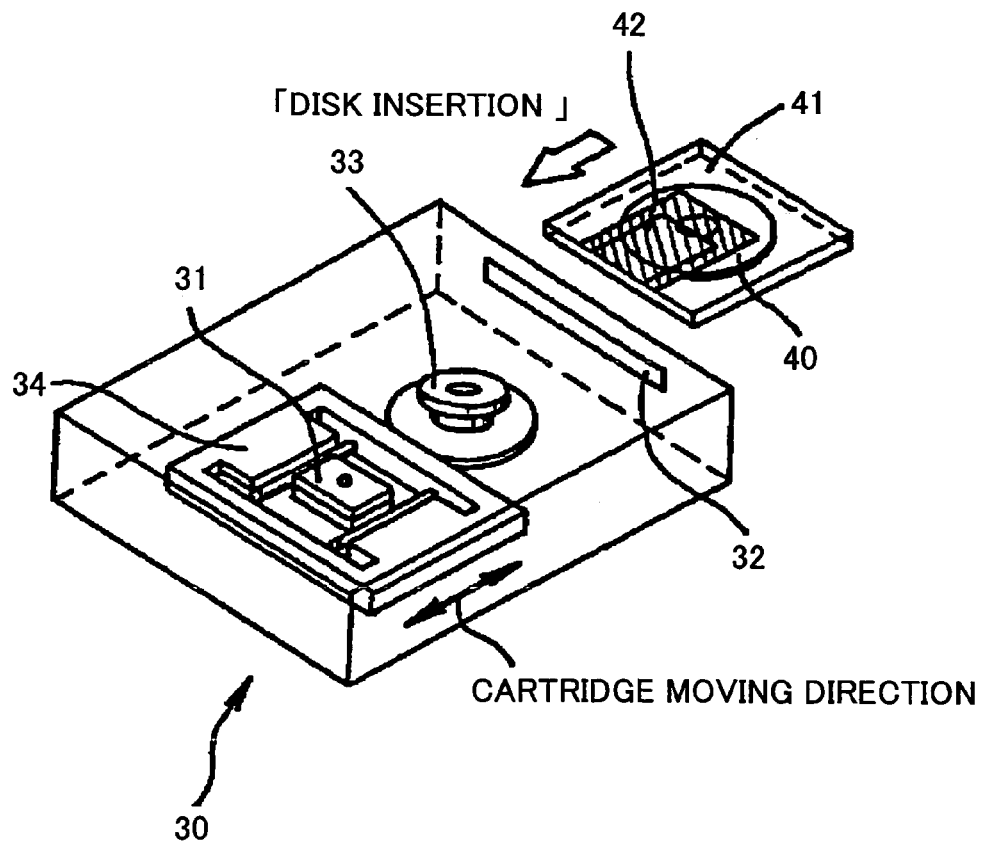
FIG. 27 is a perspective view of a data recording and reproducing apparatus 30 according to a fifth embodiment of the present invention, as an example of the optical data processing apparatus of the present invention.

FIG. 27 is a perspective view of a data recording and reproducing apparatus 30 according to a fifth embodiment of the present invention, as an example of the optical data processing apparatus of the present invention.

The data recording and reproducing apparatus 30, by an optical pickup 31, performs at least one of recording, reproduction and erasure of data in or from an optical recording medium 40.

In the fifth embodiment, the optical recording medium 40 has a disk shape, and is held in a cartridge 41 acting as a protection case. The optical recording medium 40, together with the cartridge 41, is inserted into the data recording and reproducing apparatus 30 through the insertion opening 32 in a direction indicated by "disk insertion" in FIG. 27.

The optical recording medium 40 is driven to. rotate by a spindle motor 33, and in this state, the optical pickup 31 performs data recording, reproduction or erasure in the optical recording medium 40.

The optical pickup 31 is configured as described in the previous embodiments. The optical recording medium 40 may be operated in blue, red, and infrared light wavelength regions for at least one of data recording, reproduction and erasure.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

According to the present invention, it is possible to provide an optical pickup that includes an optical element capable of phase shifting and numerical aperture switching. The optical pickup can be made thin and fabricated in fewer steps, and has a movable actuator having reduced weight and fewer parts.

The optical pickup is capable of maintaining good compatibility with DVD-type and CD-type optical recording media while being able to sufficiently correct spherical aberration.

The optical pickup is capable of realizing good compatibility with a blue-light optical recording medium, a DVD-type optical recording medium, and a CD-type optical recording medium by a two-stage numerical aperture switching operation rather than a three-stage numerical aperture switching operation, with the numerical aperture switching element being fabricated easily.

This patent application is based on Japanese Priority Patent Application No. 2003-190596 filed on Jul. 2, 2003, the entire contents of which are hereby incorporated by reference.

What is claimed is:

1. An optical pickup, comprising:
   a first light source that emits a first light beam having a wavelength equaling $\lambda 1$;
   a second light source that emits a second light beam having a wavelength equaling $\lambda 2$;
   a third light source that emits a third light beam having a wavelength equaling $\lambda 3$, the wavelengths $\lambda 1$, $\lambda 2$, and $\lambda 3$ satisfying $\lambda 1 < \lambda 2 < \lambda 3$;
   an optical system that directs at least one of the first light beam, the second light beam, and the third light beam onto an optical recording medium for a data recording/ reproducing operation on the optical recording medium;
   a phase correction element having a phase shifting part that generates a phase shift for at least one of the first light beam, the second light beam, and the third light beam, said phase shifting part including a plurality of phase shifting regions arranged in a plane perpendicular to an optical axis of the light beam, different said phase shifting regions generating different phase shifts;
   a diffraction part that diffracts the light beam, said diffraction part including a plurality of diffraction regions, at least one of the plurality of phase shifting regions separating at least two of the plurality of diffraction regions, different said diffraction regions diffracting different amounts of at least one of the first light beam, the second light beam, and the third light beam; and
   an object lens that condenses the first light beam, the second light beam and the third light beam to the optical recording medium, wherein the object lens satisfies $NA(\lambda 1) = NA(\lambda 2) > NA(\lambda 3)$, where $NA(\lambda 1)$, $NA(\lambda 2)$, $NA(\lambda 3)$ are effective numerical apertures for the first light beam, the second light beam, and the third light beam, respectively,
   wherein a first beam diameter $\phi 1$ of the first light beam, a second beam diameter $\phi 2$ of the second light beam, and a third beam diameter $\phi 3$ of the third light beam satisfy $\phi 2 > \phi 1 > \phi 3$,
   wherein the diffraction part generates a phase difference nearly equaling an integral multiple of $2\pi$ for one of the first light beam, the second light beam, and the third light beam, and
   wherein the diffraction part is formed in a first area corresponding to a beam diameter from $\phi 3$ to $\phi 2$, and in a second area corresponding to a beam diameter greater than $\phi 3$.

2. The optical pickup as claimed in claim 1, wherein the phase shifting part has a stepwise shape including more than two stages as the phase shifting regions.

3. The optical pickup as claimed in claim 1, wherein the diffraction part includes periodically arranged projecting and depressed portions formed on the phase shifting part.

4. The optical pickup as claimed in claim 1, wherein the phase shifting part includes stepwise concentric circular regions as the phase shifting regions.

5. The optical pickup as claimed in claim 1, wherein a center region of the phase shifting part and a center region of the diffraction part allow the light beam to pass through substantially without diffraction or phase shifting.

6. The optical pickup as claimed in claim 1,
   wherein the phase shifting part generates a phase shift nearly equaling an integral multiple of $2\pi$ for each of two of the first light beam, the second light beam, and the third light beam.

7. The optical pickup as claimed in claim 6, wherein the wavelength $\lambda 3$ is nearly double the wavelength $\lambda 1$, and the phase shifting part generates a phase shift nearly equaling an integral multiple of $2\pi$ for the first light beam and the third light beam.

8. The optical pickup as claimed in claim 6, wherein the phase shifting part generates a correction phase shift that produces an aberration having an opposite sign to a spherical aberration generated when the light beam without being phase-shifted by an integral multiple of $2\pi$ is condensed by the object lens on the optical recording medium.

9. The optical pickup as claimed in claim 6, wherein the object lens is configured to generate a smallest aberration when the first light beam is condensed by the object lens on the optical recording medium rather than when aberrations are generated by the second light beam and the third light beam.

10. The optical pickup as claimed in claim 6, wherein the first light beam is incident as a parallel light beam on the object lens, and at least one of the second light beam and the third light beam is incident as a diverging or focusing light beam on the object lens.

11. An optical data processing apparatus that performs at least one of data recording, data reproduction, and data erasure on at least one of an optical recording medium operated by a light beam in a blue wavelength region, an optical recording medium operated by a light beam in a red wavelength region, and an optical recording medium operated by a light beam in a infrared wavelength region, said optical data processing apparatus comprising an optical pickup, wherein the optical pickup includes:

- a first light source that emits a first light beam having a wavelength equaling $\lambda 1$;
- a second light source that emits a second light beam having a wavelength equaling $\lambda 2$;
- a third light source that emits a third light beam having a wavelength equaling $\lambda 3$, the wavelengths $\lambda 1$, $\lambda 2$, and $\lambda 3$ satisfying $\lambda 1 < \lambda 2 < \lambda 3$;
- an optical system that directs a light beam onto at least one of the optical recording medium operated by a light beam in a blue wavelength region, the optical recording medium operated by a light beam in a red wavelength region, and the optical recording medium operated by a light beam in a infrared wavelength region for a data recording/reproducing/erasing operation on the at least one of the optical recording medium operated by a light beam in a blue wavelength region, the optical recording medium operated by a light beam in a red wavelength region, and the optical recording medium operated by a light beam in a infrared wavelength region;
- a phase correction element having a phase shifting part that generates a phase shift for the light beam, said phase shifting part including a plurality of phase shifting regions arranged in a plane perpendicular to an optical axis of the light beam, different said phase shifting regions generating different phase shifts;
- a diffraction part that diffracts the light beam, said diffraction part including a plurality of diffraction regions, at least one of the plurality of phase shifting regions separating at least two of the plurality of diffraction regions, different said diffraction regions diffracting different amounts of the light beam; and
- an object lens that condenses the first light beam, the second light beam and the third light beam to the at least one of the optical recording medium operated by a light beam in a blue wavelength region, the optical recording medium operated by a light beam in a red wavelength region, and the optical recording medium operated by a light beam in a infrared wavelength region, wherein the object lens satisfies $NA(\lambda 1) = NA(\lambda 2) > NA(\lambda 3)$, where $NA(\lambda 1)$, $NA(\lambda 2)$, $NA(\lambda 3)$ are effective numerical apertures for the first light beam, the second light beam, and the third light beam, respectively, wherein a first beam diameter $\phi 1$ of the first light beam, a second beam diameter $\phi 2$ of the second light beam, and a third beam diameter $\phi 3$ of the third light beam satisfy $\phi 2 > \phi 1 > \phi 3$, wherein the diffraction part generates a phase difference nearly equaling an integral multiple of $2\pi$ for one of the first light beam, the second light beam, and the third light beam, and wherein the diffraction part is formed in a first area corresponding to a beam diameter from $\phi 3$ to $\phi 1$, and in a second area corresponding to a beam diameter greater than $\phi 1$.

* * * * *